US012634182B2

(12) United States Patent
Sheng et al.

(10) Patent No.: US 12,634,182 B2
(45) Date of Patent: May 19, 2026

(54) SIGNAL SENDING METHOD AND APPARATUS

(71) Applicant: HUAWEI TECHNOLOGIES CO., LTD., Shenzhen (CN)

(72) Inventors: Jie Sheng, Hangzhou (CN); Gongzheng Zhang, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 863 days.

(21) Appl. No.: 17/970,220

(22) Filed: Oct. 20, 2022

(65) Prior Publication Data

US 2023/0058030 A1 Feb. 23, 2023

Related U.S. Application Data

(63) Continuation of application No. PCT/CN2021/085843, filed on Apr. 7, 2021.

(30) Foreign Application Priority Data

Apr. 22, 2020 (CN) .......................... 202010323615.3

(51) Int. Cl.
*H04L 27/26* (2006.01)
*H04J 11/00* (2006.01)
*H04L 5/00* (2006.01)

(52) U.S. Cl.
CPC ...... *H04L 27/2607* (2013.01); *H04J 11/0023* (2013.01); *H04L 5/0007* (2013.01)

(58) Field of Classification Search
CPC . H04L 27/2607; H04L 5/0007; H04J 11/0023
See application file for complete search history.

(56) References Cited

U.S. PATENT DOCUMENTS

| | | | |
|---|---|---|---|
| 2008/0031369 A1* | 2/2008 | Li | H04L 5/0019 |
| | | | 375/132 |
| 2010/0054233 A1 | 3/2010 | Park et al. | |
| 2016/0233903 A1 | 8/2016 | Wu et al. | |
| 2017/0257238 A1* | 9/2017 | Qian | H04L 25/03834 |
| 2021/0135918 A1* | 5/2021 | Zewail | H04L 5/0044 |

FOREIGN PATENT DOCUMENTS

| | | | | |
|---|---|---|---|---|
| CN | 105721376 A | 6/2016 | | |
| CN | 107154907 A | 9/2017 | | |
| CN | 109417529 A | * 3/2019 | ......... | H04L 27/2607 |
| JP | 2020036106 A | 3/2020 | | |

OTHER PUBLICATIONS

International Search Report and Written Opinion in International Appln. No. PCT/CN2021/085843, mailed on Jun. 28, 2021, 19 pages (with English translation).

* cited by examiner

*Primary Examiner* — Samina F Choudhry
(74) *Attorney, Agent, or Firm* — Fish & Richardson P.C.

(57) ABSTRACT

The present disclosure relates to signal sending methods and apparatuses. In one example method, after obtaining, at a first moment, first configuration information that includes information about a first orthogonal frequency division multiplexing (OFDM) cyclic suffix length, a terminal obtains the first OFDM cyclic suffix length from the first configuration information, and communicates with a network device at a second moment after the first moment by using the first OFDM cyclic suffix length.

20 Claims, 10 Drawing Sheets

S701

Whether an update trigger condition is met

No

Yes

S702

A base station determines a new cyclic suffix length

S703

The base station delivers configuration information of the updated cyclic suffix length

S704

The base station communicates with a terminal by using the new cyclic suffix length

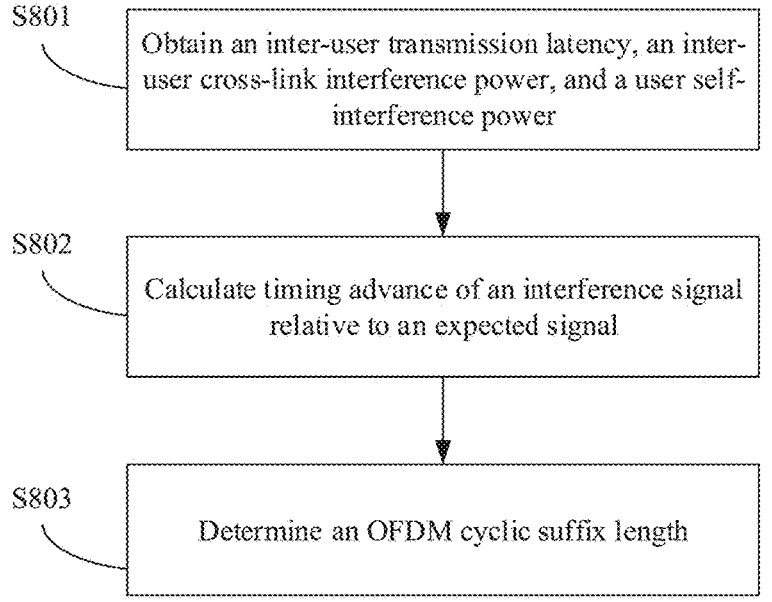

S801

Obtain an inter-user transmission latency, an inter-user cross-link interference power, and a user self-interference power

S802

Calculate timing advance of an interference signal relative to an expected signal

S803

Determine an OFDM cyclic suffix length

FIG. 8

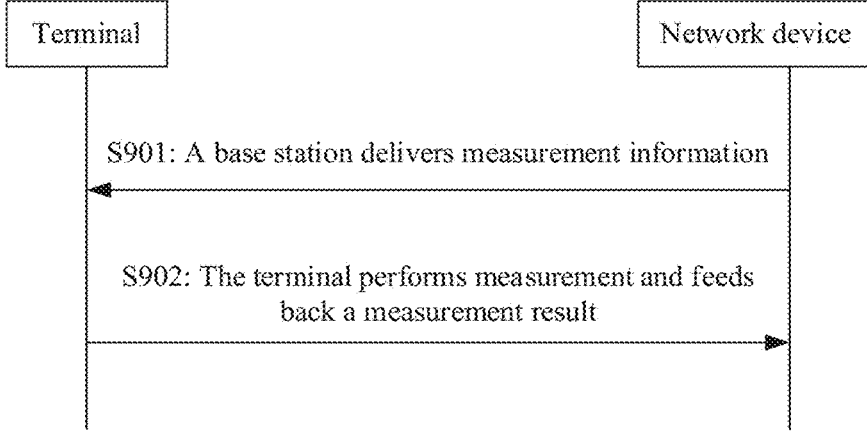

Terminal                    Network device

S901: A base station delivers measurement information

S902: The terminal performs measurement and feeds back a measurement result

FIG. 9

| CP | Data | CS | CP | Data | CS | CP | Data | CS | CP | Data | CS |
|----|------|----|----|------|----|----|------|----|----|------|----|

FIG. 10

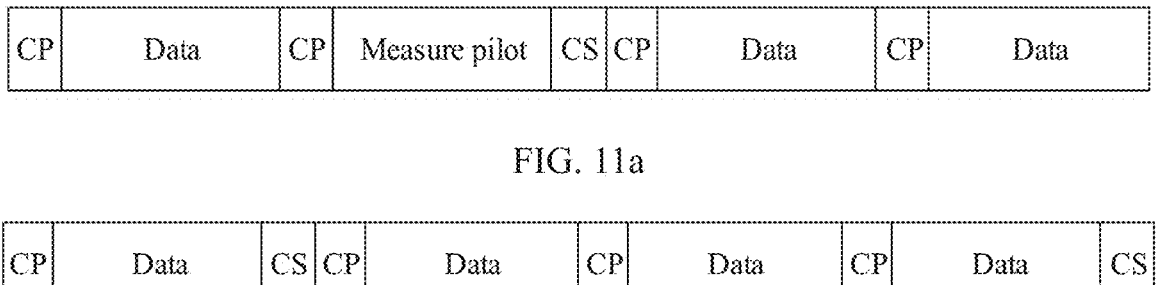
FIG. 11a
FIG. 11b
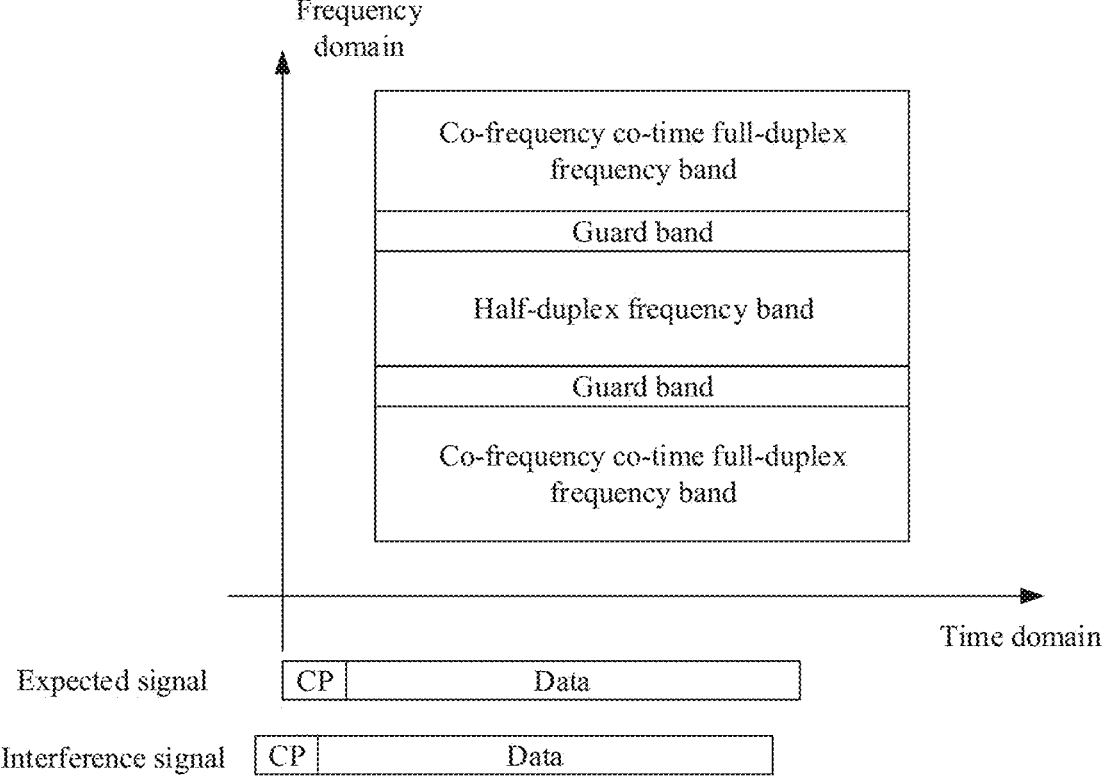
FIG. 12a

Communications
apparatus 1300

Transceiver unit 1301

Processing unit 1302

SIGNAL SENDING METHOD AND APPARATUS

CROSS-REFERENCE TO RELATED APPLICATIONS

This application is a continuation of International Application No. PCT/CN2021/085843, filed on Apr. 7, 2021, which claims priority to Chinese Patent Application No. 202010323615.3, filed on Apr. 22, 2020. The disclosures of the aforementioned applications are hereby incorporated by reference in their entireties.

TECHNICAL FIELD

This application relates to the field of communications technologies, and in particular, to a signal sending method and apparatus.

BACKGROUND

From a first-generation analog cellular mobile communications network in the mid 1970s to a second-generation mobile communications system represented by a global system for mobile communications (GSM) and IS-95 (Interim Standards 95) in the mid 1980s, and from a third generation mobile communications system proposed by the International Telecommunication Union (ITU) in 1985 to fourth and fifth generation mobile communications systems that are being widely used, a duplex method is usually frequency division duplex (FDD), time division duplex (TDD), or a combination thereof. However, only one of a spectrum resource and a time resource can be used in the foregoing several duplex manners. To meet a higher throughput rate and a higher communications capacity in a limited spectrum, researchers and scholars use the spectrum resource and the time resource at the same time, and propose a co-frequency co-time full-duplex wireless communications technology (hereinafter referred to as "full duplex"). In a full-duplex communications mode, a communications device sends and receives data on a frequency band at the same time, and spectral efficiency is doubled compared with conventional duplex modes such as the FDD and the TDD.

In addition, the co-frequency co-time full-duplex technology enables transmit and receive channels to use a same frequency for communication at the same time, which doubles the spectral efficiency. However, interference, of a signal transmitted by a transmitter and a signal transmitted by another transmitter, to a received signal needs to be eliminated. The interference may be classified into self-interference (SI) signals and cross-link interference (CLI) signals based on sources. An intra-network self-interference signal and a cross-link interference signal cause inter-symbol interference (ISI). How to estimate and suppress the SI and the CLI to avoid the inter-symbol interference ISI is an urgent problem to be resolved.

SUMMARY

Embodiments of this application provide a signal transmission method and apparatus in full-duplex communication, to avoid inter-symbol interference caused by an interference signal, ensure interference estimation and an interference suppression effect, and increase a system throughput.

According to a first aspect, an embodiment of this application provides a signal sending method, including: A terminal obtains first configuration information at a first moment, where the first configuration information includes information about a first orthogonal frequency division multiplexing OFDM cyclic suffix length; the terminal determines the first OFDM cyclic suffix length based on the first configuration information; and the terminal communicates with a network device at a second moment by using the first OFDM cyclic suffix length, where the second moment is a moment after the first moment.

In this embodiment of this application, when communicating with the network device, the terminal device uses the OFDM cyclic suffix length determined based on the configuration information that includes the OFDM cyclic suffix length. In an uplink and downlink communications process, inter-symbol interference caused by an intra-network interference signal is avoided by adding the cyclic suffix length to an OFDM symbol, and a system throughput is increased.

In a possible implementation, the terminal device communicates with the network device before the second moment by using a second OFDM cyclic suffix length. Possibly, the second OFDM cyclic suffix length is the same as or different from the first OFDM cyclic suffix length.

With reference to this implementation, it can be learned that the terminal device may communicate with the network device at the second moment by using an OFDM cyclic suffix length that is different from an OFDM cyclic suffix length used at a moment (including the first moment) before the second moment, that is, communicate with the network device by using a dynamically configured OFDM cyclic suffix length. This improves interference estimation and an interference suppression effect, further reduces a system interference level, and increases the system throughput.

In a possible implementation, the second OFDM cyclic suffix length is a default configured OFDM cyclic suffix length. When accessing the network device for an initial time, the terminal device may communicate with the network device by using the default configured OFDM cyclic suffix length. In a subsequent communications process, the used OFDM cyclic suffix length may be updated based on the configuration information sent by the network device.

In a possible implementation, the first OFDM cyclic suffix length is determined based on one or more of an inter-user cross-link interference power, a user self-interference power, or timing advance within coverage of the network device; and the timing advance includes timing advance of a cross-link interference signal relative to an expected signal and/or timing advance of a self-interference signal relative to an expected signal.

In this implementation, when the OFDM cyclic suffix length is determined, an interference power and timing advance that are of an intra-network inter-user cross-link interference signal, and an interference power and timing advance that are of a user self-interference signal are considered. In this way, an intra-network interference level can be estimated more accurately, and the interference suppression is improved to be more effective.

In a possible implementation, the terminal receives a cross-link interference measurement message delivered by the network device; the terminal determines an inter-user transmission latency and the inter-user cross-link interference power; the timing advance is determined based on the inter-user transmission latency, where the inter-user transmission latency is a transmission latency between the terminal and another terminal in a network, and the inter-user cross-link interference power is a power of interference caused by the another terminal in the network to the terminal; and the terminal feeds back the user self-interference power to the network device.

In this implementation, after receiving the cross-link interference measurement message delivered by the network device, the terminal measures an inter-user transmission latency and an inter-user cross-link interference power between the terminal and another terminal (user) in a period, and feeds back a measurement result to the network device. In this way, the network device dynamically determines an OFDM cyclic suffix length based on the intra-network inter-user cross-link interference power and the inter-user transmission latency that are fed back by the terminal, to suppress intra-network interference.

In a possible implementation, the terminal receives a self-interference measurement message delivered by the network device; and the terminal determines the user self-interference power, and feeds back the user self-interference power to the network device.

In this possible implementation, after receiving the self-interference measurement message of the network device, the terminal device determines the self-interference power of the terminal device, and feeds back the self-interference power to the network device. In this way, the network device obtains a self-interference power of terminals within the coverage of the network device, and then determines the OFDM cyclic suffix length based on the self-interference power, to suppress the intra-network interference.

In a possible implementation, when the terminal communicates with the network device, a cyclic suffix that meets the OFDM cyclic suffix length is added to each OFDM symbol; or w % ben the terminal communicates with the network device, cyclic suffixes that meet the OFDM cyclic suffix length are added to some OFDM symbols.

In this possible manner, when the terminal communicates with the network device, if the OFDM cyclic suffix is added to each OFDM symbol, the interference suppression effect can be improved, and it is ensured that there is no inter-symbol interference in the network. If the OFDM cyclic suffixes are added to the some OFDM symbols, overheads of the OFDM cyclic suffixes can be reduced while interference is suppressed, and a total throughput in the network can be increased.

In a possible implementation, the first configuration information obtained by the terminal device is a statically configured OFDM cyclic suffix length, and the statically configured OFDM cyclic suffix length meets that a signal transmitted within the coverage of the network device has no inter-symbol interference.

This possible implementation is applicable to a scenario in which network coverage is small. The terminal device obtains an OFDM cyclic suffix length from statically configured configuration information, and does not need to receive dynamically configured information. This reduces signaling interaction while ensuring that there is no inter-symbol interference between signals within the coverage of the network device, and improves communications efficiency.

According to a second aspect, an embodiment of this application provides a signal sending method, including: A network device determines a first OFDM cyclic suffix length; the network device delivers first configuration information at a first moment, where the first configuration information includes information about the first OFDM cyclic suffix length; and the network device communicates with a terminal at a second moment by using the first OFDM cyclic suffix length.

In this embodiment of this application, the network device determines the OFDM cyclic suffix length, delivers the configuration information including the information about the OFDM cyclic suffix length to the terminal device in a network, and uses the determined OFDM cyclic suffix length in subsequent communication with the terminal device. In a subsequent uplink and downlink communications process, inter-symbol interference caused by an intra-network interference signal is avoided by adding a cyclic suffix, determined by the network device, to an OFDM symbol, and a system throughput is increased.

In a possible implementation, the network device communicates with the terminal device before the second moment by using a second OFDM cyclic suffix length. Possibly, the second OFDM cyclic suffix length is the same as or different from the first OFDM cyclic suffix length.

With reference to this implementation, the network device communicates with the terminal device at the second moment by using the OFDM cyclic suffix length determined at the first moment, and communicates with the terminal device before the second moment by using an OFDM cyclic suffix length (namely, the second OFDM cyclic suffix length) determined before the first moment or configured by default. The OFDM cyclic suffix used in the uplink and downlink communication is dynamically configured by determining the OFDM cyclic suffix length at different moments in the communications process. This improves interference estimation and an interference suppression effect, further reduces a system interference level, and increases the system throughput.

In a possible implementation, the second OFDM cyclic suffix length used by the network device before the second moment is a default configured OFDM cyclic suffix length. When the terminal device accesses the network device for an initial time, the network device may communicate with the terminal device by using the default configured OFDM cyclic suffix length. In a subsequent communications process, the network device may dynamically update the configuration information of the OFDM cyclic suffix length.

In a possible implementation, when the terminal accesses the network for an initial time, the network device determines the OFDM cyclic suffix length; or the network device determines the OFDM cyclic suffix length when an update trigger condition is met. The foregoing update trigger condition includes one or more of the following: timing of a timer started after the network device delivers an OFDM cyclic suffix length configuration ends, or an overall network interference level or a cell throughput monitored by the network device in real time reaches a trigger threshold. Alternatively, another manner is used as the update trigger condition.

A new terminal accesses, leaves, or initiates an uplink/downlink service in a cell covered by the network device. In the foregoing implementation, the network device determines and delivers the OFDM cyclic suffix length when the terminal accesses the network device for the initial time, and periodically or dynamically determines a new OFDM cyclic suffix length based on an interference level and a throughput in the cell. This ensures effectiveness of interference estimation and interference suppression.

In a possible implementation, the network device determines the OFDM cyclic suffix length based on one or more of an inter-user cross-link interference power, a user self-interference power, or timing advance within coverage, where the timing advance includes timing advance of a cross-link interference signal relative to an expected signal and/or timing advance of a self-interference signal relative to an expected signal.

In this implementation, when the network device determines the OFDM cyclic suffix length, an interference power and timing advance that are of an intra-network inter-user cross-link interference signal, and an interference power and timing advance that are of a user self-interference signal are considered. In this way, an intra-network interference level can be estimated more accurately, and the interference suppression is improved to be more effective.

In a possible implementation, the network device delivers a cross-link interference measurement message to the terminal, where the cross-link interference measurement message is used to obtain an inter-user transmission latency and the inter-user cross-link interference power, and the inter-user transmission latency is used to determine the timing advance.

In the foregoing implementation, the network device delivers the measurement message to the terminal device, to obtain parameters used to determine the cyclic suffix length, such as the power and the timing advance that are of the inter-user cross-link interference signal. The measurement message delivered by the network device includes at least one or more pieces of information such as an OFDM symbol format, a reference signal (RS) port number, and a time-frequency resource that are of a measurement signal. In this way, the terminal device performs field measurement on a terminal surrounding the terminal device based on the measurement message, and feeds back a measurement result. According to the foregoing method, the intra-network inter-user cross-link interference power and the intra-network inter-user transmission latency are obtained in real time. This improves accuracy of determining the OFDM cyclic suffix length, and ensures the effectiveness of the interference estimation and the interference suppression.

In a possible implementation, the network device determines an inter-user transmission latency based on location information of the terminal, where the inter-user transmission latency is used to determine the timing advance, and the inter-user cross-link interference power is determined based on an uplink transmit power of the terminal.

In the foregoing implementation, the network device obtains, by itself based on parameters such as the location information of the terminal device, parameters used to determine the cyclic suffix length, such as the power and the timing advance that are of the inter-user cross-link interference signal. The inter-user cross-link interference power and the inter-user transmission latency are obtained by using the foregoing method, and measurement information does not need to be sent to a user. This reduces signaling overheads.

In a possible implementation, the network device delivers a self-interference power measurement message to the terminal, where the self-interference measurement message is used to obtain the user self-interference power.

Possibly, the self-interference measurement message delivered by the network device may include at least information such as an OFDM symbol format, an RS port number, and a time-frequency resource that are of a measurement signal, or include a measurement enabling flag. In this way, after receiving the measurement message, the terminal device measures interference power of the terminal device and feeds back a measurement result to the network device.

In a possible implementation, the network device determines the user self-interference power based on a self-interference cancellation capability of the terminal, where the self-interference cancellation capability is obtained based on a UE capability reported by the terminal.

In the foregoing possible manner, the UE capability reported when the terminal device accesses the network device includes the self-interference cancellation capability of the terminal, and the network device obtains the user self-interference power based on the self-interference cancellation capability without sending the measurement information to the terminal device. This reduces the signaling overheads.

In a possible implementation, the timing advance of the cross-link interference signal relative to the expected signal is obtained based on a transmission latency between the terminal and the network device and a transmission latency between terminals, and is specifically determined according to the following formula.

$$\Delta t_{i,j} = t_i + t_j - t_{i,j}.$$

$\Delta t_{i,j}$ represents the timing advance of the cross-link interference signal relative to the expected signal, $t_i$ represents a transmission latency between the network device and a terminal i, $t_j$ represents a transmission latency between the network device and a terminal j, and $t_{i,j}$ represents a transmission latency between the terminal i and the terminal j.

The timing advance of the self-interference signal relative to the expected signal is obtained based on a transmission latency between the terminal and the network device, and is specifically equal to $2t_i$, where $t_i$ represents a transmission latency between the network device and the terminal i.

In a possible implementation, the network device uses a maximum value of the timing advance as the OFDM cyclic suffix length. When the network device cannot obtain the inter-user cross-link interference power or the user self-interference power, the network device may determine the OFDM cyclic suffix length based on the maximum value of the timing advance of the interference signal relative to the expected signal, to suppress intra-network inter-symbol interference.

In a possible implementation, the network device determines the OFDM cyclic suffix length according to any one of the following formulas:

$$t_{cs} = \operatorname{argmax} \left[ \frac{t_{sym} - t_{cs}}{t_{sym}} \right.$$

$$\log_2 \left( \prod_{i=0}^{M-1} \left( 1 + P_i^{rx} \middle/ \left( \sum_{j=0, \Delta t_{i,j} > t_{cs}}^{N-1} P_{i,j}^{CLI} + u(2t_i - t_{cs})P_i^{SI} + n_i \right) \right) \right) \right],$$

or $$t_{cs} = \operatorname{argmax} \left[ \frac{t_{sym}}{t_{cs}} \right.$$

$$\log_2 \left( \prod_{i=0}^{M-1} \left( 1 + P_i^{rx} \middle/ \left( \sum_{j=0, \Delta t_{i,j} > t_{cs}}^{N-1} P_{i,j}^{CLI} + u(2t_i - t_{cs})P_i^{SI} + n_i \right) \right) \right) \right].$$

$t_{cs}$ represents a cyclic suffix length, $t_{sym}$ represents an OFDM symbol length, M represents a quantity of terminals that are in a downlink service and that are in a full-duplex network, N represents a quantity of terminals that are in an uplink service and that are in the full-duplex network, $$P_i^{rx}$$

7 represents an expected signal power received by the downlink terminal i, $$P_{i,j}^{CLI}$$

represents an interference power of the uplink terminal j to the downlink terminal i, $$P_i^{SI}$$

represents a self-interference power of the downlink terminal i, $\Delta t_{i,j}$ represents the timing advance of the cross-link interference signal relative to the expected signal, $2t_i$, represents timing advance of a self-interference signal of the terminal i relative to the expected signal, $$u(t) = \begin{cases} 0, t < 0 \\ 1, t \geq 0 \end{cases},$$

and $n_i$ represents a w % bite noise power of the terminal i.

In the foregoing implementation, the network device determines the OFDM cyclic suffix length based on the inter-user cross-link interference power, the user self-interference power, and the timing advance, and considers cyclic suffix overheads, to suppress the inter-symbol interference and increase a network throughput.

In a possible implementation, that the network device communicates with a terminal by using the OFDM cyclic suffix length includes:

when the network device communicates with the terminal, adding a cyclic suffix that meets the OFDM cyclic suffix length to each OFDM symbol, to improve the interference suppression effect and ensure that there is no inter-symbol interference in the network; or when the network device communicates with the terminal, adding cyclic suffixes that meet the OFDM cyclic suffix length to some OFDM symbols, to suppress the interference, reduce the OFDM cyclic suffix overheads, and increase the network throughput.

In a possible implementation, the first configuration information sent by the network device to the terminal device is a statically configured OFDM cyclic suffix length, and the statically configured OFDM cyclic suffix length meets that a signal transmitted within the coverage of the network device has no inter-symbol interference.

According to a third aspect, an embodiment of this application provides a communications apparatus, including:

a processing unit, configured to: obtain first configuration information at a first moment, where the first configuration information includes information about a first OFDM cyclic suffix length, and determine the first OFDM cyclic suffix length based on the first configuration information; and a transceiver unit, configured to communicate with a network device at a second moment by using the first OFDM cyclic suffix length, where the second moment is a moment after the first moment.

The communications apparatus provided in the third aspect may be a terminal. When communicating with the network device by using the transceiver unit of the terminal device, the terminal device determines the OFDM cyclic suffix length by using the configuration information obtained by the processing unit, and adds the cyclic suffix length to an OFDM symbol. This avoids inter-symbol interference caused by an intra-network interference signal, and increases a system throughput.

In a possible implementation, the transceiver unit is further configured to communicate with the network device before the second moment by using a second OFDM cyclic suffix length.

In a possible implementation, the transceiver unit is further configured to receive a cross-link interference measurement message delivered by the network device; the processing unit is further configured to determine an inter-user transmission latency and the inter-user cross-link interference power; the timing advance is determined based on the inter-user transmission latency; the inter-user transmission latency is a transmission latency between the communications apparatus and another terminal in a network, and the inter-user cross-link interference power is a power of interference caused by the another terminal in the network to the communications apparatus; and the transceiver unit is further configured to feed back a user self-interference power and/or the inter-user transmission latency to the network device.

In a possible implementation, the transceiver unit is further configured to receive a self-interference measurement message delivered by the network device; the processing unit is further configured to determine the user self-interference power; and the transceiver unit is further configured to feed back the user self-interference power to the network device.

In a possible implementation, that a transceiver unit is configured to communicate with a network device at a second moment by using the first OFDM cyclic suffix length includes: When the transceiver unit communicates with the network device, the processing unit is further configured to add a cyclic suffix that meets the OFDM cyclic suffix length to each OFDM symbol; or when the transceiver unit communicates with the network device, the processing unit is further configured to add a cyclic suffix that meets the OFDM cyclic suffix length to some OFDM symbols.

According to a fourth aspect, an embodiment of this application provides a communications apparatus, including:

a processing unit, configured to determine a first OFDM cyclic suffix length; and a transceiver unit, configured to deliver first configuration information at a first moment, where the first configuration information includes information about the first OFDM cyclic suffix length, and the transceiver unit is further configured to communicate with a terminal at a second moment by using the first OFDM cyclic suffix length.

The communications apparatus provided in the fourth aspect may be a network device. The processing unit of the network device determines the OFDM cyclic suffix length, delivers the configuration information including the information about the OFDM cyclic suffix length to the terminal device in a network by using the transceiver unit, and uses the determined OFDM cyclic suffix length in subsequent communication with the terminal device. In a subsequent uplink and downlink communications process, inter-symbol interference caused by an intra-network interference signal is avoided by adding a cyclic suffix, determined by the processing unit, to an OFDM symbol, and a system throughput is increased.

In a possible implementation, the transceiver unit is further configured to communicate with the terminal device before the second moment by using a second OFDM cyclic suffix length.

In a possible implementation, that a processing unit is configured to determine an OFDM cyclic suffix length includes: The processing unit is configured to: when the terminal accesses the communications apparatus for an initial time, determine the OFDM cyclic suffix length; or the processing unit is configured to: when an update trigger condition is met, determine the OFDM cyclic suffix length.

The foregoing update trigger condition includes one or more of the following: timing of a timer started by the processing unit after the transceiver unit delivers an OFDM cyclic suffix length configuration ends, or an overall network interference level or a cell throughput monitored by the communications apparatus in real time reaches a trigger threshold.

In a possible implementation, that a processing unit is configured to determine an OFDM cyclic suffix length includes: The processing unit is specifically configured to determine the OFDM cyclic suffix length based on one or more of an inter-user cross-link interference power, a user self-interference power, or timing advance within coverage, where the timing advance includes timing advance of a cross-link interference signal relative to an expected signal and/or timing advance of a self-interference signal relative to an expected signal.

In a possible implementation, the transceiver unit is further configured to deliver a cross-link interference measurement message to the terminal, the cross-link interference measurement message is used to obtain an inter-user transmission latency and the inter-user cross-link interference power, and the inter-user transmission latency is used to determine the timing advance.

In a possible implementation, the processing unit is further configured to: determine an inter-user transmission latency based on location information of the terminal, where the inter-user transmission latency is used to determine the timing advance; and determine the inter-user cross-link interference power based on an uplink transmit power of the terminal.

In a possible implementation, the transceiver unit is further configured to deliver a self-interference power measurement message to the terminal, where the self-interference measurement message is used to obtain the user self-interference power.

In a possible implementation, the processing unit is further configured to determine the user self-interference power based on a self-interference cancellation capability of the terminal.

In a possible implementation, the processing unit is further configured to use a maximum value of the timing advance as the OFDM cyclic suffix length.

In a possible implementation, the timing advance of the cross-link interference signal relative to the expected signal is obtained based on a transmission latency between the terminal and the communications apparatus and a transmission latency between terminals, and is specifically determined according to the following formula:

$$\Delta t_{i,j} = t_i + t_j - t_{i,j}.$$

$\Delta t_{i,j}$ represents the timing advance of the cross-link interference signal relative to the expected signal, $t_i$ represents a transmission latency between the communications apparatus and a terminal i, $t_j$ represents a transmission latency between the communications apparatus and a terminal j, and $t_{i,j}$ represents a transmission latency between the terminal i and the terminal j; and the timing advance of the self-interference signal relative to the expected signal is obtained based on a transmission latency between the terminal and the communications apparatus, and is specifically equal to $2t_i$, where $t_i$ represents a transmission latency between the communications apparatus and the terminal i.

In a possible implementation, the processing unit is specifically configured to determine the first OFDM cyclic suffix length according to the following formula:

$$t_{cs} = \operatorname{argmax}\left[\frac{t_{sym} - t_{cs}}{t_{sym}} \log_2\left(\prod_{i=0}^{M-1}\left(1 + P_i^{rx} \middle/ \left(\sum_{j=0,\Delta t_{i,j} > t_{cs}}^{N-1} P_{i,j}^{CLI} + u(2t_i - t_{cs})P_i^{SI} + n_i\right)\right)\right)\right].$$

$t_{cs}$ represents a cyclic suffix length, $t_{sym}$ represents an OFDM symbol length, M represents a quantity of terminals that are in a downlink service and that are within coverage of the communications apparatus, N represents a quantity of terminals that are in an uplink service and that are within the coverage of the communications apparatus, $$P_i^{rx}$$

represents an expected signal power received by the downlink terminal i, $$P_{i,j}^{CLI}$$

represents an interference power of the uplink terminal j to the downlink terminal i, $$P_i^{SI}$$

represents a self-interference power of the downlink terminal i, $\Delta t_{i,j}$ represents the timing advance of the cross-link interference signal relative to the expected signal, $2t_i$ represents timing advance of a self-interference signal of the terminal i relative to the expected signal, $$u(t) = \begin{cases} 0, t < 0 \\ 1, t \geq 0 \end{cases},$$

and $n_i$ represents a white noise power of the terminal i.

In a possible implementation, that the transceiver unit is configured to communicate with a terminal at a second moment by using the OFDM cyclic suffix length includes: When the transceiver unit communicates with the terminal, the processing unit is further configured to add a cyclic suffix that meets the OFDM cyclic suffix length to each OFDM symbol; or when the transceiver unit communicates with the terminal, the processing unit is further configured to add a cyclic suffix that meets the OFDM cyclic suffix length to some OFDM symbols.

According to a fifth aspect, a communications apparatus is provided, including a processor, where the processor is coupled to a memory, the memory is configured to store a computer program or instructions, and the processor is configured to execute the computer program or the instructions in the memory, to perform the method provided in any one of the first aspect and the possible implementations of the first aspect.

Possibly, the memory coupled to the processor may be located outside the communications apparatus, or may be integrated with the processor.

In a possible implementation, the apparatus further includes a transceiver, configured to implement transmission and reception functions of the communications apparatus.

According to a sixth aspect, a communications apparatus is provided, including a processor, where the processor is coupled to a memory, the memory is configured to store a computer program or instructions, and the processor is configured to execute the computer program or the instructions in the memory, to perform the method provided in any one of the second aspect and the possible implementations of the second aspect.

Possibly, the memory coupled to the processor may be located outside the communications apparatus, or may be integrated with the processor.

In a possible implementation, the apparatus further includes a transceiver, configured to implement transmission and reception functions of the communications apparatus.

According to a seventh aspect, a communications apparatus is provided, including an input interface, a logic circuit, and an output interface. The logic circuit is configured to perform the method in any one of the first aspect and the possible implementations of the first aspect or the method in any one of the second aspect and the possible implementations of the second aspect.

According to an eighth aspect, a computer-readable storage medium is provided, where the computer-readable storage medium stores a computer program or instructions, and when the computing program or the instructions are executed on a computer, the method in any one of the first aspect and the possible implementations of the first aspect or the method in any one of the second aspect and the possible implementations of the second aspect is performed.

According to a ninth aspect, a computer program product is provided, where when the computer program product is executed by a computer, the method in any one of the first aspect and the possible implementations of the first aspect or the method in any one of the second aspect and the possible implementations of the second aspect is performed.

According to a tenth aspect, a chip is provided, including a processor, where the processor is configured to invoke a computer program from a memory and run the computer program, to perform the method in any one of the first aspect and the possible implementations of the first aspect or the method in any one of the second aspect and the possible implementations of the second aspect.

BRIEF DESCRIPTION OF DRAWINGS

FIG. 8 is a schematic flowchart of a signal sending method according to an embodiment of this application;

FIG. 9 is a schematic interaction diagram of a signal sending method according to an embodiment of this application;

FIG. 10 is a schematic diagram of a structure of an OFDM symbol according to an embodiment of this application;

FIG. 11*a* is a schematic diagram of a structure of an OFDM symbol according to an embodiment of this application;

FIG. 11*b* is a schematic diagram of a structure of an OFDM symbol according to an embodiment of this application:

FIG. 12*a* is a schematic diagram of structures of a frequency domain signal and a time domain signal according to an embodiment of this application:

DESCRIPTION OF EMBODIMENTS

Figure 1:
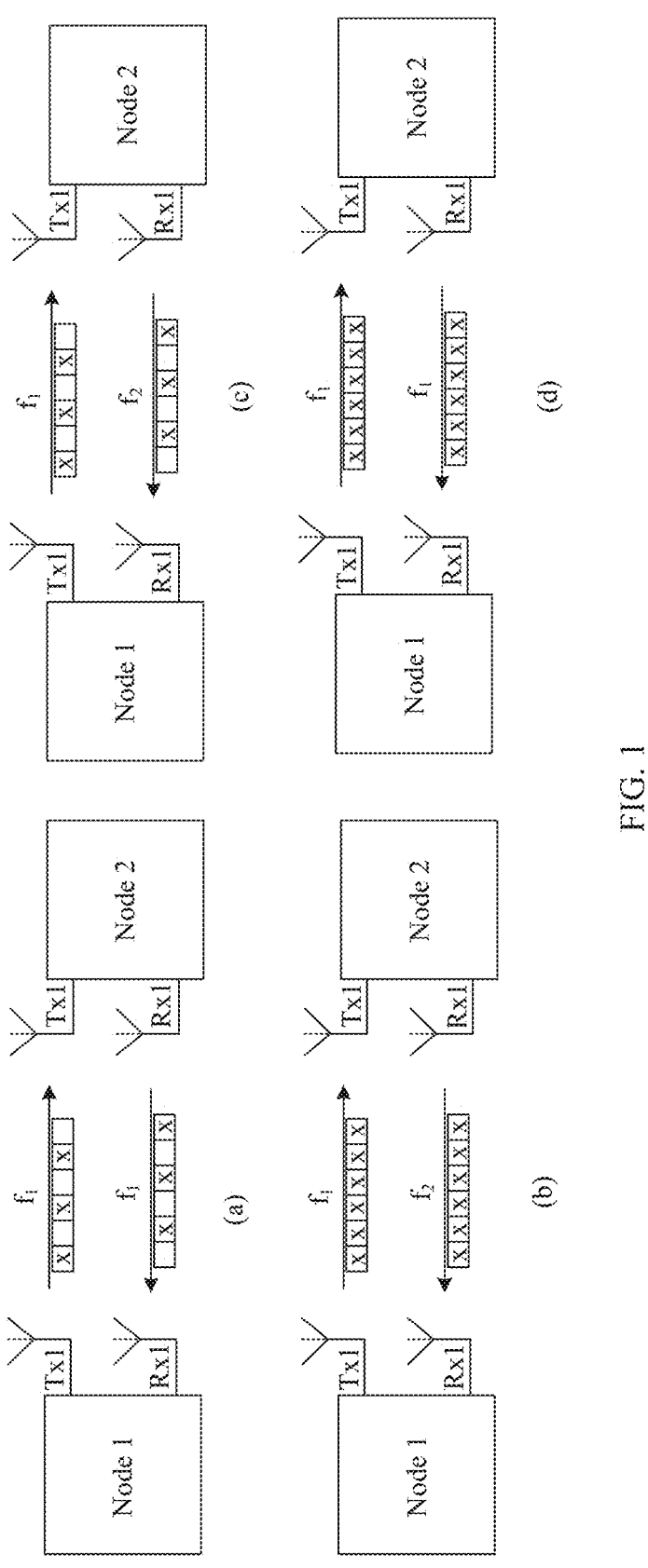
FIG. 1 is a schematic diagram of different full-duplex systems.

Embodiments of this application provide a signal transmission method and apparatus, to avoid inter-symbol interference caused by an interference signal, ensure interference estimation and an interference suppression effect, and increase a system throughput. The method and the apparatus are conceived according to a same application. Because problem-resolving principles of the method and the apparatus are similar, mutual reference may be made to implementations of the apparatus and the method, and repeated parts are not described again.

The following clearly describes the technical solutions in embodiments of this application with reference to the accompanying drawings in embodiments of this application. It is clearly that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims of embodiments of this application, the terms "first", "second", and the like are intended to distinguish between different objects but do not indicate a particular order of the objects. For example, a first target object, a second target object, and the like are used to distinguish between different target objects, but are not used to describe a particular order of the target objects.

In embodiments of this application, a word such as "example" or "for example" is used for representing an example, an example illustration, or description. Any embodiment or design solution described as "example" or "for example" in embodiments of this application is not to be construed as being more preferred or advantageous than other embodiments or design solutions. Exactly, use of the word such as "example" or "for example" is intended to present a related concept in a specific manner.

In the description of embodiments of this application, "a plurality of" means two or more than two unless otherwise specified. For example, a plurality of processing units refer to two or more processing units, and a plurality of systems refer to two or more systems.

It should be noted that, in this embodiment of this application, "uplink" may be a signal transmission direction in which a wireless access device receives a signal, and a signal transmission direction in which a terminal sends a signal. "Downlink" may be a signal transmission direction in which a wireless access device sends a signal, and a signal transmission direction in which a terminal receives a signal. "Uplink user" indicates a user in an uplink service, namely, a terminal that sends an uplink signal to a wireless access device. "Downlink user" indicates a user in a downlink service, namely, a terminal that receives a downlink signal from a wireless access device. Certainly, other variations or substitutions based on this shall fall within the protection scope of this application.

It should be noted that "first moment" and "second moment" in embodiments of this application relate to concepts of a radio frame. For example, if the first moment and the second moment are a same moment, it indicates that the first moment and the second moment indicate a same time-frequency resource, that is, indicate a same subframe number in a same system frame number. However, it does not necessarily indicate that the first moment and the second moment are a same moment in absolute time. For example, a network device delivers configuration information to a terminal device at the first moment, the terminal obtains the configuration information at the first moment, to indicate the network device to add the configuration information to a radio frame whose system frame number is 11 and whose subframe number is 5, and user equipment receives the radio frame whose system frame number is 11 and whose subframe number is 5, and obtains the configuration information from the radio frame.

The technical solutions in embodiments of this application may be applied to communications systems including but not limited to a narrowband Internet of things (NB-IoT) system, a long term evolution (LTE) system, three application scenarios of a 5G mobile communications system: enhanced mobile broadband (eMBB), ultra-reliable low-latency communication (URLLC), and massive machine type communications (mMTC), or a new communications system, for example, 6G.

Embodiments of this application relate to a terminal. The terminal may be user equipment (UE), an access terminal, a subscriber unit, a subscriber station, a mobile station, a remote station, a remote terminal, a mobile device, a user terminal (TE), a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a tablet computer (pad), a handheld device with a wireless communications function, a computing device or another processing device connected to a wireless modem, a vehicle-mounted device, a wearable device, a terminal device in a 5G network or a network after 5G, or the like. With development of wireless communications technologies, a device that can access a communications system, communicate with a network side of the communications system, or communicate with another object by using the communications system may be a terminal in embodiments of this application, for example, a terminal and a vehicle in intelligent transportation, a household device in a smart home, an electric meter reading instrument in a smart grid, a voltage monitoring instrument, an environmental monitoring instrument, a video surveillance instrument in an intelligent security network, a cash register, a machine type communications (MTC) terminal, and the like. This is not limited in this application.

Embodiments of this application further relate to a network device. The network device may be a device configured to communicate with a terminal device, for example, may be a base station (BTS) in a GSM system or CDMA system, a NodeB (NB) in a WCDMA system, an evolved NodeB (eNB or eNodeB) in an LTE system, a next generation NodeB (gNB) in a 5G system, a transmission reception point (TRP), a relay node, or an access point (AP). Alternatively, the network device may be a relay station, an access point, a vehicle-mounted device, a wearable device, a network side device in a future network system, or the like. This is not limited in this application.

The network device in embodiments of this application may be a network device in a cell, or may be a base station in a cell or a network device having a function similar to a function of a base station. The network device may be a network device that provides wireless access and communications services for a mobile or fixed terminal device in a cell.

To facilitate understanding of embodiments of this application, the following briefly describes full-duplex communication.

In a communications system, a duplex method is usually frequency division duplex FDD, time division duplex TDD, or a combination thereof. However, only one of a spectrum resource and a time resource can be used in the foregoing several duplex manners. In addition, a co-frequency co-time full-duplex (CCFD) wireless communications technology (hereinafter referred to as "full-duplex") uses both of the spectrum resource and the time resource. In a full-duplex communications mode, a communications device sends and receives data on a frequency band at the same time, and spectral efficiency is doubled compared with conventional duplex modes such as the FDD and the TDD. FIG. 1 is a schematic diagram of different duplex manners. (a) is a TDD system, and an uplink and a downlink in the TDD system are distinguished by using different slots. For example, a transmit signal and a receive signal of a node 1 are transmitted on different time resources, and the same applies to a node 2. (b) and (c) are FDD systems, and in the FDD system, an uplink and a downlink are distinguished by using different spectrums. For example, a transmit signal and a receive signal of a node 1 are transmitted on different spectrum resources, and the same applies to a node 2. (d) is a CCFD system. A transmit signal and a receive signal of a node 1 are transmitted on a same time domain resource and a same frequency domain resource, and the same applies to a node 2.

Figure 2:
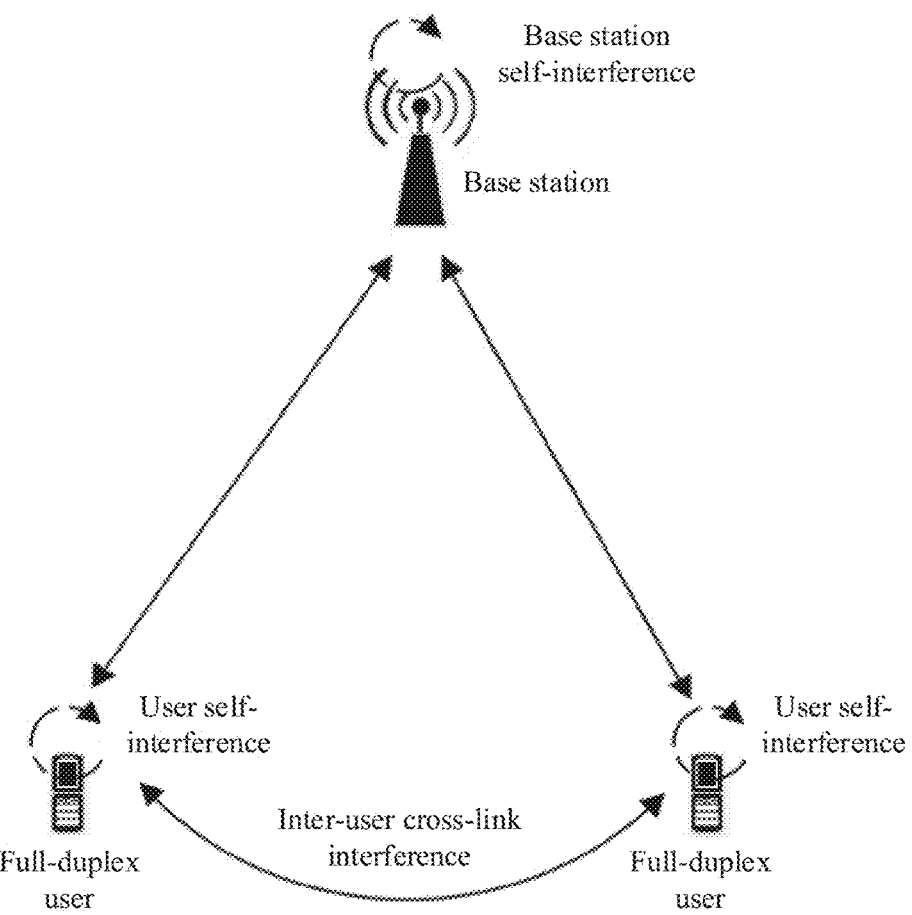
FIG. 2 is a schematic diagram of interference in a co-frequency co-time full-duplex system.

The full-duplex technology enables transmit and receive channels to use a same frequency for communication, which doubles frequency efficiency. However, in a full-duplex system, a device performs co-frequency co-time receiving and transmitting, and a receive antenna receives a transmit signal from the device, namely, self-interference SI. Because transmit and receive antennas of a same device are close to each other or even a same antenna, strength of a self-interference signal is much higher than strength of a wanted signal. As a result, a component in a receiver is saturated, and the wanted signal is lost. In addition, the receive antenna receives a transmit signal from another nearby device, namely, cross-link interference CLI. FIG. 2 is a schematic diagram of interference in a full-duplex system. As shown in FIG. 2, when receiving a signal, a network device is interfered with by interference generated by a transmit signal of a base station, namely, self-interference of the network device. When receiving a signal, a terminal is interfered with by interference generated by a transmit signal of the terminal, namely, self-interference of the terminal. In addition, the terminal is interfered with by interference generated by a transmit signal of another nearby terminal, namely, cross-link interference between terminals.

In addition, because distances between terminals and base stations are different, interference signals and expected signals received by the terminals are asynchronous in time. Inter-symbol interference is caused by an inter-user cross-link interference signal, a user self-interference signal, and the asynchronization between the interference signal and the expected signal.

Figure 3:
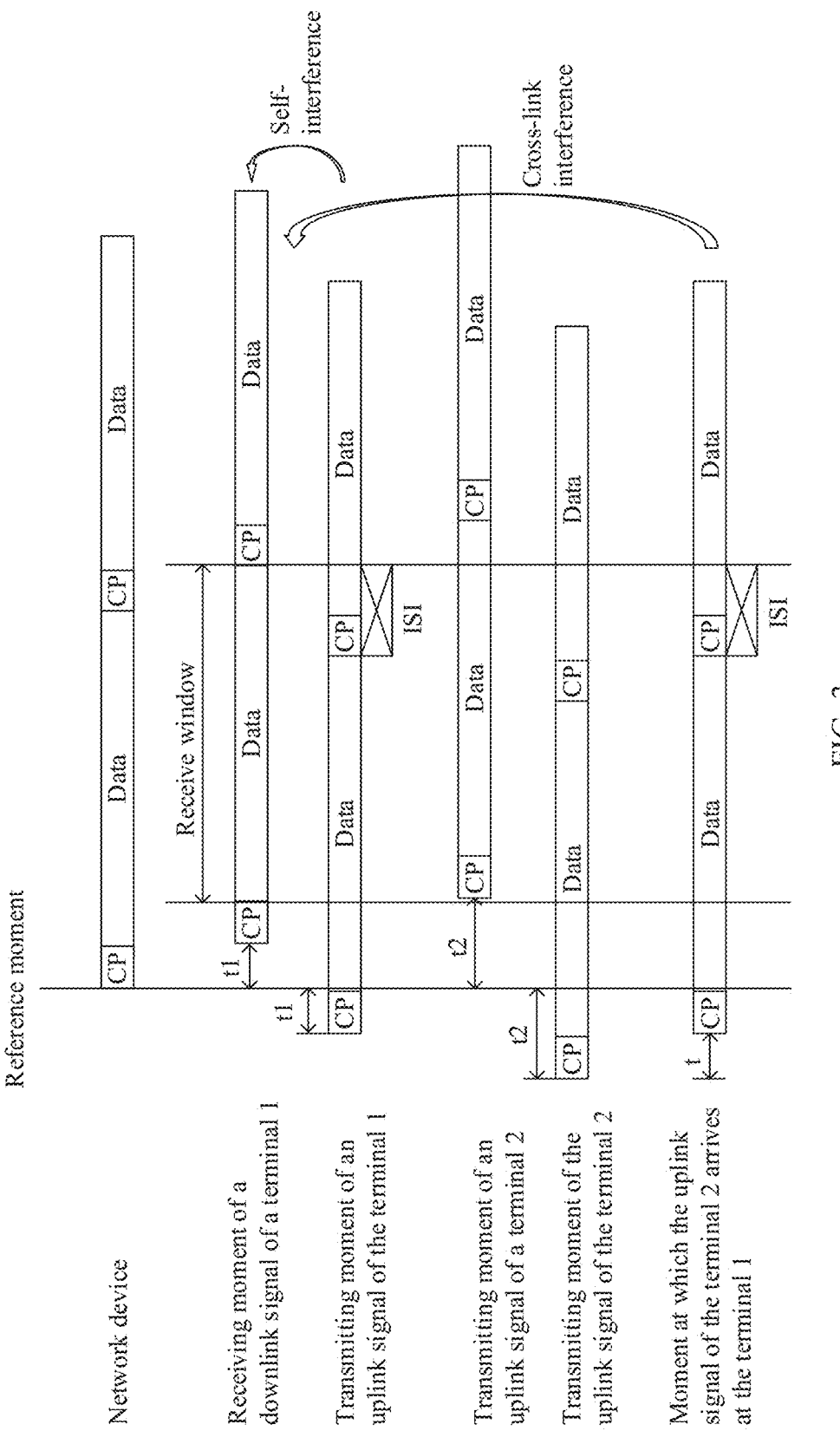
FIG. 3 is a schematic diagram of a timing relationship between user equipment and a network device in a full-duplex communications process.

FIG. 3 shows a timing relationship between a network device and different terminals in a full-duplex system. The network device, a terminal 1, and a terminal 2 in FIG. 3 are all in a full-duplex mode.

For ease of understanding, synchronization in a communications system is first briefly described. In a conventional technology, synchronization is a basic requirement of a cellular mobile communications system, and in particular, in LTE and 5G systems based on orthogonal frequency division multiplexing (OFDM). A synchronization causes severe inter-symbol interference (ISI) and inter-carrier interference (ICI). In a conventional cellular mobile communications system, during downlink transmission, all downlink signals of terminals in a cell are sent by a network device. Therefore, the downlink signals can be synchronized. In an uplink transmission process, the network device receives uplink signals sent by different terminals. Because distances between the terminals and the network device may be different, and time at which the uplink signals arrive at the network device may be different due to a difference in propagation time of the signals. A timing advance mechanism is used to implement uplink synchronization (that is, uplink signals in a same slot arrive at a base station at the same time). To be specific, different terminals send signals in advance at a specific amount of time based on distances between the terminals and the network device, to ensure that the signals sent by the terminals arrive at the network device at the same time.

In addition, to resist a multipath effect caused by a complex radio propagation environment, a cyclic prefix (CP) added before an OFDM symbol ensures orthogonality of OFDM subcarrier, and a C P length (referring to a symbol length occupied by the CP) is usually related to a maximum transmission latency of a multipath.

FIG. 3 is used as an example. The network device sends downlink data to the terminal 1, and the data is received by the terminal 1 after a propagation latency of t1. An uplink signal of the terminal 1 is sent t1 earlier than a reference moment, to ensure that the uplink signal of the terminal 1 is aligned with an uplink signal receive window of the network device. Similarly, the network device sends downlink data to the terminal 2, and the data is received by the terminal 2 after a propagation latency of t2. An uplink signal of the terminal 2 is sent t2 earlier than the reference moment, to ensure that the uplink signal of the terminal 2 is aligned with the uplink signal receive window of the network device. All the foregoing data transmission is performed on a same frequency domain resource.

As shown in FIG. 3, a downlink receive window of the terminal 1 includes an expected downlink signal, and further includes a residual uplink transmit signal of the terminal 1 after self-interference cancellation and an uplink transmit signal of the terminal 2 that arrives at the terminal 1 after a propagation latency t. If the terminal can obtain the interference signals through measurement, interference rejection combining (IRC) may be used to suppress interference. However, because an interference signal in a wanted signal receive window may include a signal in a next OFDM symbol period, a result of interference estimation is subject to severe inter-symbol interference ISI, and interference suppression performance is affected. For example, the downlink receive window of the terminal 1 in FIG. 3 includes a self-interference signal crossing two OFDM symbol periods and a cross-link interference signal crossing two OFDM symbol periods.

In this embodiment of this application, a cyclic suffix (CS) with a configurable length is added to an existing OFDM symbol, so that the wanted signal receive window of the terminal device in the full-duplex system includes only an interference signal in one OFDM symbol period. This avoids subcarrier orthogonality damage caused by the ISI of the interference signal, and ensures interference estimation and an interference suppression effect.

Figure 4:
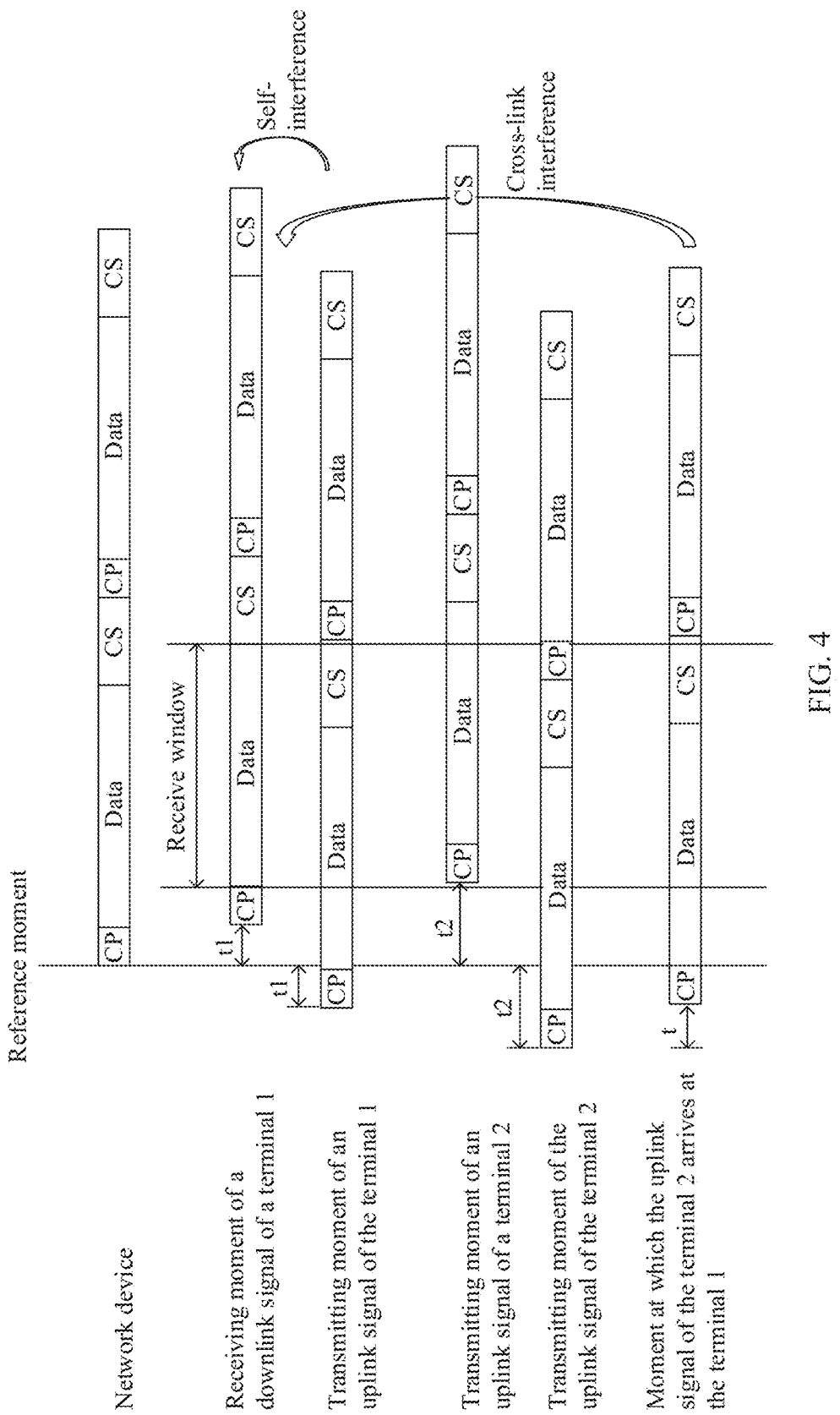
FIG. 4 is a schematic diagram of a timing relationship of user equipment after a cyclic suffix is added according to an embodiment of this application.

FIG. 4 is used as an example. FIG. 4 shows a timing relationship between a network device and different terminals in a full-duplex system in which a cyclic suffix is added. After the cyclic suffix is added, an OFDM symbol period includes a cyclic prefix CP, an OFDM symbol, and a cyclic suffix CS. Similar to FIG. 3, the network device sends downlink data to the terminal 1, and the data is received by the terminal 1 after the propagation latency of t1. An uplink signal of the terminal 1 is sent t1 earlier than the reference moment. Similarly, the network device sends downlink data to the terminal 2, and the data is received by the terminal 2 after the propagation latency of t2. An uplink signal of the terminal 2 is sent t2 earlier than the reference moment, and the uplink signal of the terminal 2 arrives at the terminal 1 after a propagation latency. All the foregoing data transmission is performed on a same frequency domain resource.

A downlink receive window of the terminal 1 includes an expected downlink signal, and further includes a residual uplink transmit signal of the terminal 1 after self-interference cancellation and an uplink transmit signal of the terminal 2 that arrives at the terminal 1 after a propagation latency t. Different from FIG. 3, after a variable-length cyclic suffix is added, it can be avoided that an interference signal existing in the downlink receive window of the terminal 1 includes a signal in a next OFDM symbol period, and existence of the ISI is avoided.

The following describes in detail the technical solutions in embodiments of this application.

Figure 5:
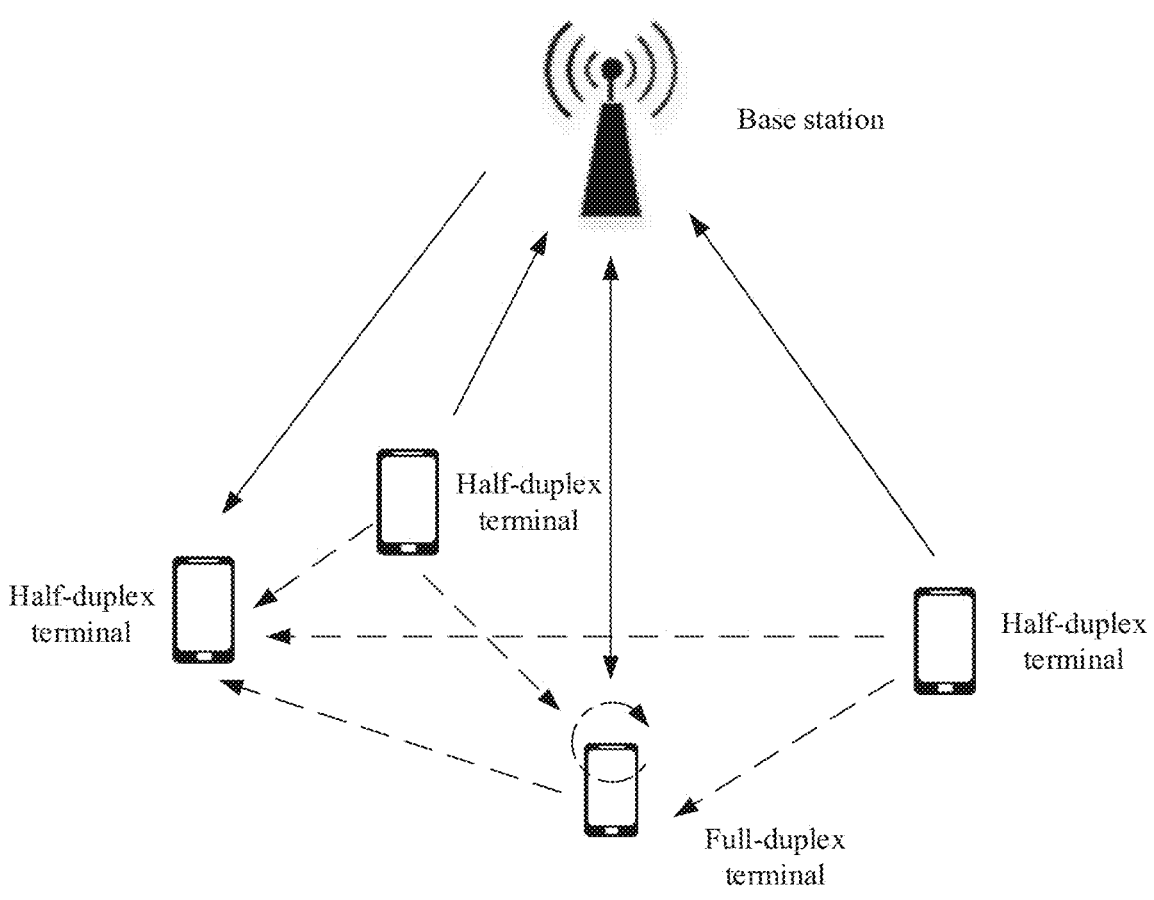
FIG. 5 is a schematic diagram of an application scenario of full-duplex communication according to an embodiment of this application.

FIG. 5 is a diagram of an application scenario according to an embodiment of this application. A network device provides a communications service for a terminal device. The terminal may be a full-duplex terminal or a half-duplex terminal. The network device communicates with a terminal in a half-duplex mode in a half-duplex manner, and the network device communicates with a terminal in a full-duplex mode in a full-duplex manner. In this embodiment of this application, the terminal may be any one or more of the foregoing terminals, and the network device may be any one of the foregoing network devices. This is not limited in this application.

Figure 6:
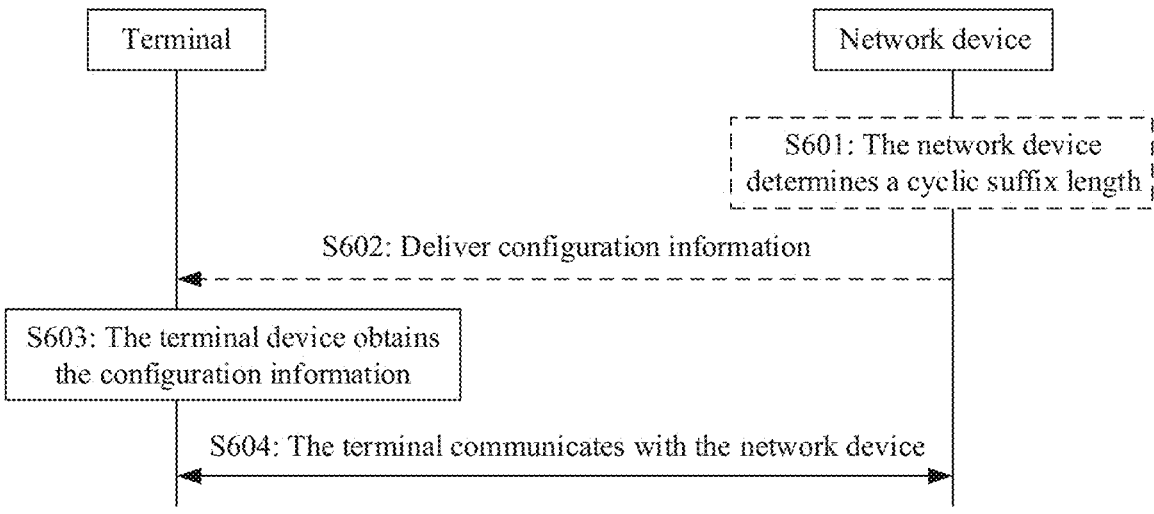
FIG. 6 is a schematic interaction diagram of a signal sending method according to an embodiment of this application.

FIG. 6 is a schematic interaction diagram of a signal sending method according to an embodiment of this application.

S601: A network device determines a cyclic suffix length.

It should be noted that the network device determines the cyclic suffix length in S601.

In a possible implementation, the network device configures a same cyclic suffix length for all uplink and downlink terminals in a cell, and the network device may send configuration information of a cyclic suffix to the terminals in the cell through broadcasting. In this implementation, the network device uniformly adjusts cyclic suffix lengths of users in the cell, and implementation complexity is low.

In a possible implementation, the network device configures different cyclic suffix lengths for different users in the cell; or groups the users in the cell, and allocates different cyclic suffix lengths to users in different groups. This implementation is more flexible for configuration, but implementation complexity is high.

Step S601 is an optional step. In a possible implementation, the network device communicates with the terminal device by using a default configured cyclic suffix length. In this case, step S601 does not need to be performed.

For example, the network device determines a first OFDM cyclic suffix length.

In a possible implementation, the network device determines the first OFDM cyclic suffix length $t_{cs}$ based on one or more of a self-interference power of a terminal, a cross-link interference power between terminals, and timing advance of a self-interference signal or a cross-link interference signal relative to an expected signal that are in a full-duplex network.

In a possible implementation, the network device further considers cyclic suffix overheads when determining the OFDM cyclic suffix length. As shown in FIG. 4, after the cyclic suffix CS is added, an OFDM symbol period includes a cyclic prefix CP, an OFDM symbol, and a cyclic suffix CS. Therefore, a cyclic suffix CS length affects OFDM symbol duration (namely, DATA part time in FIG. 4) or an OFDM symbol period, and may affect a quantity of OFDM symbols in one slot. Therefore, when determining the first OFDM cyclic suffix length, the network device further considers the overheads caused by the cyclic suffix length.

The following describes in detail a method for determining the OFDM cyclic suffix length by the network device.

S602: The network device delivers the configuration information to the terminal, and the terminal receives the configuration information delivered by the network device. The configuration information includes information about the OFDM cyclic suffix length.

Step S602 is an optional step. When the network device communicates with the terminal device by using the default configured cyclic suffix length, the step does not need to be performed.

For example, the network device sends the configuration information to the terminal at a first moment, where the configuration information includes the information about the first OFDM cyclic suffix length.

It should be noted that the configuration information may be notified to the terminal by using signaling.

In a possible implementation, the network device sends the configuration information to the terminal by using radio resource control (RRC) signaling.

In a possible implementation, the network device sends the configuration information to the terminal in the cell in a broadcast manner.

In a possible implementation, the network device sends the configuration information to the terminal by using a system information block (System Information Bit, SIB for short).

Possibly, the configuration information may indicate an index, the index corresponds to an entry, and the entry indicates a cyclic suffix configuration value.

Possibly, the configuration information may further indicate a specific configuration value.

Possibly, the configuration information may further indicate a cyclic suffix adjustment value.

After receiving the adjustment value, the terminal obtains a current cyclic suffix configuration value by accumulating the adjustment value on a basis of a previous cyclic suffix configuration value, where the adjustment value may be a positive number or a negative number.

It should be noted that the network device may alternatively send the configuration information to the terminal device by using other signaling or in another manner. This is not limited in this application.

In a possible implementation, when the terminal accesses the network device for an initial time, the network device delivers the configuration information. In a possible implementation, when an update trigger condition is met, the network device delivers the configuration information.

S603: The terminal device obtains the configuration information, where the configuration information includes the information about the OFDM cyclic suffix length.

For example, the terminal device obtains the configuration information at the first moment.

In a possible implementation, the configuration information is configuration information that is of the OFDM cyclic suffix length and that is configured by the network device and the terminal by default.

In a possible implementation, the configuration information is the configuration information sent by the network device at the first moment in S602. For example, the network device adds the configuration information to a radio frame whose system frame number is 10 and whose subframe number is 2, and the terminal device obtains the configuration information from the radio frame whose system frame number is 10 and whose subframe number is 2.

S604: The terminal communicates with the network device.

That the terminal device communicates with the network device includes that the terminal device communicates with the network device by using an OFDM cyclic suffix length.

For example, the terminal device communicates with the network device at a second moment by using the first OFDM cyclic suffix length. Before the second moment, the terminal device communicates with the network device by using a second OFDM cyclic suffix length. The second moment is a moment after the first moment.

In a possible implementation, the first OFDM cyclic suffix length is the default configured cyclic suffix length. Possibly, the second OFDM cyclic suffix length is also the default configured length, that is, the first OFDM cyclic suffix length is the same as the second OFDM cyclic suffix length.

In a possible implementation, the first OFDM cyclic suffix length is the first OFDM cyclic suffix length included in the configuration information sent by the network device to the terminal device in step S602. Possibly, the second OFDM cyclic suffix length is an OFDM cyclic suffix length included in the configuration information sent by the network device to the terminal device before the first moment. The first OFDM cyclic suffix length may be the same as the second OFDM cyclic suffix length, or may be different from the second OFDM cyclic suffix length. This is not limited in this application.

It should be noted that the network device communicates with the terminal by using the new cyclic suffix length in S604. Specifically, in a process in which the network device communicates with the terminal, an OFDM symbol period of an uplink/downlink transmission signal includes a cyclic suffix, and a cyclic suffix length (namely, cyclic suffix duration) of the cyclic suffix may be determined by using configuration information that is of the cyclic suffix length and that is delivered by the network device.

In a possible implementation, when the network device communicates with the terminal by using the new cyclic suffix, a cyclic suffix that meets the OFDM cyclic suffix length is added to each OFDM symbol. For example, FIG. 10 is a diagram of a structure of an OFDM signal obtained after the cyclic suffix is added to each OFDM symbol. As shown in FIG. 10, each OFDM symbol period includes a cyclic prefix CP, an OFDM symbol (DATA) carrying data, and a cyclic suffix CS.

In a possible implementation, when the network device communicates with the terminal by using the new cyclic suffix, cyclic suffixes that meet the OFDM cyclic suffix length are added to some OFDM symbols.

It should be noted that when the cyclic suffixes are added to the some OFDM symbols, the symbol to which the cyclic suffix is added may be a symbol carrying a specific signal or a specified symbol negotiated by the network device and the terminal. This is not limited in this application. A possible specified symbol negotiated by the network device and the terminal may be a symbol that has a high requirement on a bit error rate. The cyclic suffixes are added to the symbols to reduce interference and improve decoding accuracy of a receiver. For example, FIG. 11a is a diagram of a possible structure of an OFDM signal obtained after the cyclic suffixes are added to the some OFDM symbols. As shown in FIG. 11a, a first OFDM symbol period includes a cyclic prefix CP and an OFDM symbol, and a second OFDM symbol period includes a cyclic prefix CP, an OFDM symbol, and a cyclic suffix CS. The second OFDM symbol period in FIG. 11a is used to carry an interference measurement pilot (measure pilot), and the terminal may measure information such as interference of another current user and an inter-user propagation latency by using the measurement pilot.

Possibly, when the cyclic suffixes are added to the some OFDMs, periodic configuration may be performed. The network device and the terminal device negotiate a period of adding the OFDM cyclic suffix, or the network device specifies the period of adding the OFDM cyclic suffix in a manner such as broadcasting. For example, FIG. 11b is a diagram of a possible structure of an OFDM signal obtained after the cyclic suffixes are added to the some OFDM symbols. As shown in FIG. 11b, the cyclic suffix is added to an OFDM symbol after every two OFDM periods. To be specific, a first OFDM symbol period and a fourth OFDM symbol period include a cyclic prefix CP, an OFDM symbol, and a cyclic suffix CS, and a second OFDM symbol period and a third OFDM symbol period include a cyclic prefix CP and an OFDM symbol.

While inter-symbol interference ISI is suppressed, overheads of the cyclic suffixes can be reduced by adding the cyclic suffixes CS to the some OFDM symbols.

In the foregoing embodiment, the terminal device obtains the configuration information of the OFDM cyclic suffix length, and performs communication by using the OFDM cyclic suffix length in subsequent communication between the terminal and the network device. This reduces inter-symbol interference caused by self-interference of a full-duplex terminal and cross-link interference between terminals that are in the full-duplex network, and increases a system throughput.

However, as new terminals continuously access, leave, or initiate uplink and downlink services in a cell served by the network device, an interference power in the cell and a transmission latency between terminals also correspondingly change. Therefore, the network device determines, based on a requirement, the cyclic suffix length again, and updates the configuration information of the cyclic suffix length.

Figure 7:
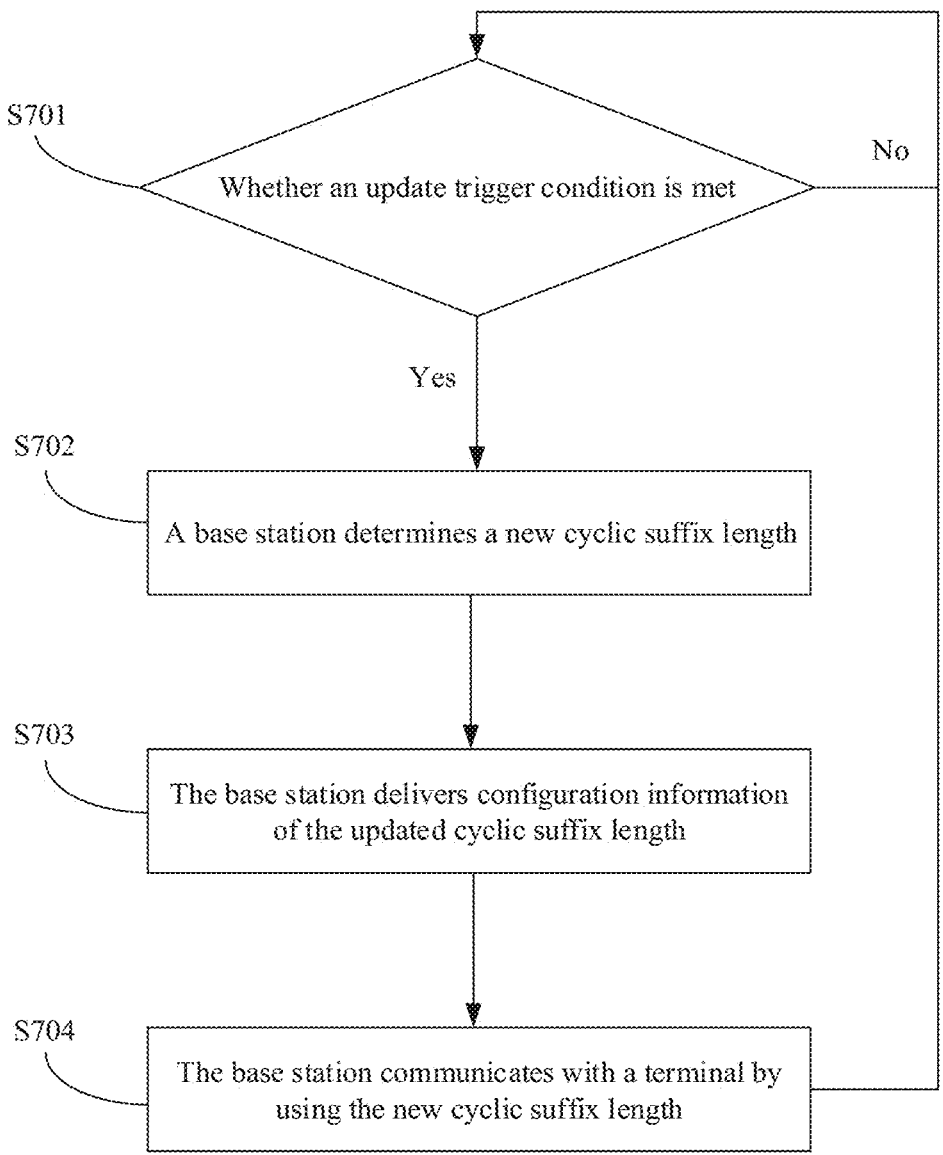
FIG. 7 is a schematic flowchart of a signal sending method according to an embodiment of this application.

FIG. 7 is a schematic flowchart of updating a cyclic suffix length by a network device.

S701: The network device determines whether an update trigger condition is met.

In a possible implementation, the update trigger condition is timing triggering. For example, after delivering configuration information of the cyclic suffix length, the network device starts a timer, and after the timer expires, a base station updates the cyclic suffix length; the network device updates the cyclic suffix length based on a user measurement period; or the network device periodically updates the cyclic suffix length in another manner. This is not limited in this application.

In a possible implementation, the update trigger condition is event triggering. For example, the network device monitors a real-time interference level and/or a cell throughput in a network, and when the overall interference level or the cell throughput triggers an adjustment threshold, the network device updates the cyclic suffix length.

S702 to S704: When the update trigger condition is met, the network device determines a new cyclic suffix length and delivers configuration information of the updated cyclic suffix length, and receives a feedback that is sent by a terminal and that indicates that the length information is correctly obtained, where the network device communicates with the terminal by using the updated new cyclic suffix length. For specific content of steps S702 and S703, refer to S601 to S602 in FIG. 6. For specific content of step S704, refer to S604 in FIG. 6. Details are not described herein again.

In this embodiment, the network device determines the new cyclic suffix length by determining the update trigger condition, and updates the configuration information of the cyclic suffix length sent to the terminal. This ensures effectiveness of interference estimation and interference suppression.

The following describes in detail that the network device determines the cyclic suffix length (S601 and S702).

For ease of describing embodiments of this application, it is assumed that there are M terminals (users) within coverage of the network device that are in a downlink service, and there are N terminals (users) in an uplink service. In other words, there are M downlink users and N uplink users within the coverage of the network device. If the terminal is a full-duplex terminal (a full-duplex user), the terminal belongs to both the uplink user and the downlink user, i represents a user index of a downlink user, j represents a user index of an uplink user, $$P_{i,j}^{CLI}$$

represents an interference power of the uplink user j to the downlink user i, and $$P_i^{SI}$$

represents a residual interference power of an uplink signal received by the downlink user i, namely, a self-interference power of the downlink user i, $t_i$ and $t_j$ respectively represent a transmission latency from the network device to the user i and a transmission latency from the network device to the user j, and $t_{i,j}$ represents a transmission latency from the user j to the user i.

$$P_i^{rx}$$

represents an expected signal power received by the downlink user i.

$$P_j^{tx}$$

represents a transmit signal power of the uplink user j.

It should be noted that, if the terminal is a half-duplex terminal (a half-duplex user), a self-interference power of the terminal is 0; or if the terminal is the full-duplex terminal, a self-interference power of the terminal is related to a transmit signal and a self-interference cancellation capability of the terminal.

In an embodiment provided in this application, the network device determines an OFDM cyclic suffix length based on an inter-user cross-link interference power, a user self-interference power, and timing advance within the coverage of the network device.

FIG. 8 is a schematic flowchart of determining an OFDM cyclic suffix length by a network device.

S801: The network device obtains an inter-user transmission latency $t_{i,j}$, an inter-user cross-link interference power $$P_{i,j}^{CLI},$$

and a user self-interference power $$P_i^{SI}.$$

In a possible implementation, the network device delivers a cross-link interference measurement message to a terminal, to obtain the inter-user transmission latency $t_{i,j}$, and the inter-user cross-link interference power $$P_{i,j}^{CLI}.$$

As shown in FIG. 9, in S901, the network device delivers a measurement message to a terminal to indicate the terminal to measure another terminal surrounding the terminal, and the terminal receives the measurement message sent by the network device. The measurement message includes at least one or more pieces of information such as an OFDM symbol format, a reference signal (RS) port number, and a time-frequency resource that are of a measurement signal. The OFDM symbol format of the measurement signal includes a cyclic prefix CP length, a cyclic suffix CS length, and a data symbol length.

In S902, the terminal performs measurement and feeds back a measurement result to the network device, and the network device receives the measurement result sent by the terminal. The terminal measures a cross-link interference power $$P_{i,j}^{CLI}$$

and the inter-user transmission latency $t_{i,j}$, by using the measurement signal. The measurement signal may be an uplink signal used by the terminal in a normal service process, for example, a sounding reference signal (SRS), a demodulation reference signal (DMRS), or the like. Alternatively, the measurement signal may be a signal used at a measurement moment specified by the network device. This is not limited in this application. The terminal feeds back the measurement result to the network device. The measurement result includes at least information such as a reference signal received power (RSRP) that corresponds to an RS port of the measurement signal, and a transmission latency. The measurement result may further include an angle of arrival that corresponds to the RS port of the measurement signal and antenna configuration information of the terminal, for example, an omnidirectional antenna, a directional antenna a polarization angle, or the like.

In a possible implementation, the terminal device may periodically measure another terminal in a network, obtain an interference power of the another device to the terminal and a transmission latency from the another device to the terminal, and send a measurement result to the network device. In this implementation, the cross-link interference power may be measured by using a measurement signal and/or a time-frequency resource that are/is configured by the network device during initial access or by using a default configuration.

In a possible implementation, the network device calculates the inter-user propagation latency $t_{i,j}$, and the inter-user cross-link interference power $$P_{i,j}^{CLI}$$

by using calculation parameters. For example, the network device obtains geographical location information of terminals (users) within coverage of the network device, and calculates only a spatial distance and the propagation latency $t_{i,j}$, between users based on locations of the terminals. The network device may further obtain an uplink transmit power of the terminals with the coverage of the network device, and further calculate, based on the spatial distance between the users and the uplink transmit power of the terminals and by using a path loss model, the inter-user cross-link interference power $$P_{i,j}^{CLI}$$

at which the uplink signal arrives at the another terminal.

In a possible implementation, the network device delivers the measurement message to the terminal, to obtain a user self-interference power $$P_i^{SI}.$$

Possibly, the network device sends a self-interference measurement message to a full-duplex user in the terminal. The network device delivers the self-interference measurement message to the terminal, to indicate the terminal to measure a residual interference power of the uplink signal of the terminal, namely, a self-interference power of the terminal. The terminal receives the self-interference measurement message sent by the network device. Similar to the cross-link interference measurement message delivered by the network device, the self-interference measurement message delivered by the network device may include at least information such as an OFDM symbol format, an RS port number, and a time-frequency resource of the measurement signal. It should be noted that because an uplink transmit signal of the terminal is known to the terminal, the network device does not need to notify detailed measurement content. The self-interference measurement message delivered by the network device may include only a measurement enable flag, and the measurement enable flag indicates whether the terminal performs measurement based on a specific measurement signal. The terminal measures the self-interference power of the terminal, and feeds back a measurement result to the network device. The measurement feedback result includes information about the self-interference power of the terminal. The measurement signal used by the terminal to measure the self-interference power may be an uplink signal used by the terminal in a normal service process, for example, an SRS or a DMRS. Alternatively, the measurement signal may be a signal used at a measurement moment specified by the network device. This is not limited in this application.

In a possible implementation, the terminal device may measure the self-interference power of the terminal device, and periodically send the self-interference power $$P_i^{SI}$$

of the terminal to the network device. The measurement signal used by the terminal to measure the self-interference power may be the uplink signal used by the terminal in the normal service process.

It should be noted that when the terminal is in a half-duplex mode, a downlink signal of the terminal is interfered only with by an uplink signal of another user, and is not interfered with by a signal sent by the terminal itself. In this case, the self-interference power of the terminal is 0.

In a possible implementation, the network device calculates the user self-interference power of the terminal based on a self-interference cancellation capability of the terminal. Specifically, when the terminal accesses the network, the network device obtains the self-interference cancellation capability of the terminal. For example, the terminal uses the self-interference cancellation capability as a UE capability (a subitem of the UE capability). Self-interference cancellation capabilities of the terminals may be statically stored by category. As shown in Table 1, the users may be classified into six levels, and each level corresponds to a different cancellation capability. An index 0 indicates that the terminal is a half-duplex user and does not support a full-duplex mode, and that a residual self-interference power is 0. The network device may obtain the self-interference cancellation capabilities of the terminals in a table lookup manner, and calculate the residual self-interference power of the terminal based on a transmit signal power and the self-interference cancellation capability of the terminal. Specifically, the network device uses a result obtained by subtracting the self-interference cancellation capability from the transmit signal power as the residual self-interference power of the user.

TABLE 1

Table of a self-interference cancellation capability

| User category index | Self-interference cancellation capability |
|---|---|
| 0 | 0 dB |
| 1 | 70 dB |
| 2 | 80 dB |
| 3 | 90 dB |
| 4 | 100 dB |
| 5 | 110 dB |

For example, a ue-FullDuplexClass field may be added to a BandNR subitem in a radio frequency parameter (RF parameter) information element in a UE capability in the standard TS 38.331. A value of the field may be fd0, fd1, fd2, fd3, fd4, or fd5, respectively representing self-interference cancellation capabilities corresponding to indexes 0 to 5 in Table 1. The following is an example, and the italic part in black is the recommended ue-FullDuplexClass field to be added:

```
BandNR ::=                    SEQUENCE {
    bandNR                        FreqBandIndicatorNR,
    modifiedMPR-Behaviour         BIT STRING (SIZE (8))
    ...
```

-continued

```
OPTIONAL,
   crossCarrierScheduling-SameSCS              ENUMERATED {supported}
OPTIONAL,
   pdsch-256QAM-FR2                            ENUMERATED {supported}
OPTIONAL,
   pusch-256QAM                               ENUMERATED {supported}
OPTIONAL,
   ue-PowerClass                              ENUMERATED {pc1, pc2, pc3, pc4}
OPTIONAL,
   ue-FullDuplexClass                         ENUMERATED  {fd0,fd1,fd2,fd3,fd4,fd5}
...
}
```

S802: The network device calculates timing advance of an interference signal relative to an expected signal.

The network device separately calculates timing advance of a cross-link interference signal relative to the expected signal and timing advance of a self-interference signal relative to the expected signal.

The timing advance of the cross-link interference signal relative to the expected signal is determined by the inter-user transmission latency, and is specifically determined according to the following formula: $\Delta t_{i,j}=t_i+t_j-t_{i,j}$, $t_i$ and $t_j$ respectively represent a transmission latency from the network device to a user i and a transmission latency from the network device to a user j, $t_{i,j}$ represents a transmission latency from the user j to the user i. $\Delta t_{i,j}$ represents timing advance of a moment at which a transmit signal of the uplink user j arrives at the downlink user i relative to a moment at which the expected signal sent by the network device to the downlink user i arrives at the downlink user i, namely, the timing advance of the cross-link interference signal relative to the expected signal.

The timing advance of the self-interference signal relative to the expected signal is determined by the transmission latency from the network device to the terminal, and specifically is $\Delta t_i=2t_i$. $\Delta t_i$ represents timing advance of an uplink signal of the user i relative to a downlink signal of the user i, namely, the timing advance of the self-interference signal relative to the expected signal.

S803: The network device determines the OFDM cyclic suffix length.

The network device determines the OFDM cyclic suffix length based on the inter-user transmission latency, the inter-user cross-link interference power, and the user self-interference power. Specifically, the network device determines the OFDM cyclic suffix length by performing scheduling according to at least one of the following rules: an overall interference level in the network covered by the network device is the lowest, an overall throughput is the largest, a throughput of a user is the largest, throughputs of some users are the largest, or the like.

In the foregoing embodiment, the network device obtains the inter-user cross-link interference power, the user self-interference power, and the timing advance of the interference signal relative to the expected signal by using a method in which the user is indicated to perform calculation by using the calculation parameter or perform measurement, and determines the OFDM cyclic suffix length according to a specific rule and by using the foregoing parameter. In this way, when the network device communicates with the terminal by using the OFDM cyclic suffix length, the interference level in the network can be reduced, and the system throughput can be improved.

In some cases, the network device cannot obtain the inter-user cross-link interference power and/or the user self-interference power by using the method in which the user is indicated to perform calculation by using the calculation parameter or perform measurement. The network device needs to accurately measure interference in the network.

In an embodiment provided in this application, the network device determines the OFDM cyclic suffix length based on the timing advance of the interference signal relative to the expected signal. The timing advance of the self-interference signal relative to the expected signal includes timing advance of an inter-user cross-link interference signal relative to the expected signal and/or timing advance of a user self-interference signal relative to the expected signal.

In a possible implementation, the network device determines the OFDM cyclic suffix length based on a maximum value of the timing advance of the interference signal relative to the expected signal. The OFDM cyclic suffix length $t_{cs}$ is specifically expressed according to the following formula:

$$t_{cs} = \max(\Delta t_{i,j}, 2t_i), 0 \leq i \leq N - 1, 0 \leq j \leq M - 1.$$

$\Delta t_{i,j}$ represents the timing advance of the moment at which the transmit signal of the uplink user j arrives at the downlink user i relative to the moment at which the expected signal sent by the network device to the downlink user i arrives at the downlink user i, namely, the timing advance of the cross-link interference signal of the user j to the user i relative to the expected signal. $2t_i$ represents timing advance of a moment at which the uplink signal of the user i arrives at a downlink signal receive window of the user i relative to a moment at which the expected signal sent by the network device to the user i arrives at the downlink signal receive window of the user i, namely, timing advance of a self-interference signal of the user i relative to the expected signal. N represents a quantity of terminals (users) in an uplink service in a network, and M represents a quantity of terminals (users) in a downlink service in the network.

The maximum value of the timing advance of the interference signal relative to the expected signal is used as the cyclic suffix length. In this way, there is no inter-symbol interference between uplink and downlink signals between the network device and the terminals in the system.

In a possible implementation, when a user in a network is mainly interfered with by self-interference, and the network device does not consider or cannot obtain the self-interference power, the network device determines the OFDM cyclic suffix length based on a maximum value of the timing advance of the self-interference signal relative to the expected signal. The OFDM cyclic suffix length $t_{cs}$ is specifically expressed according to the following formula:

$$t_{cs} = \max(2t_i), \ 0 \le i \le N - 1. \qquad (5)$$

$2t_i$ represents timing advance of a moment at which the uplink signal of the user i arrives at a downlink signal receive window of the user i relative to a moment at which the expected signal sent by the network device to the user i arrives at the downlink signal receive window of the user i, namely, timing advance of a self-interference signal of the user i relative to the expected signal. N represents a quantity of terminals (users) in an uplink service in the network.

In a possible implementation, when a user in a network is mainly interfered with by inter-user cross-link interference, and the network device does not consider or cannot obtain the inter-user cross-link interference power, for example, when most terminals in the network are in the half-duplex mode, the network device determines the OFDM cyclic suffix length based on a maximum value of the timing advance of the inter-user cross-link interference signal relative to the expected signal. The OFDM cyclic suffix length $t_{cs}$ is specifically expressed according to the following formula:

$$t_{cs} = \max(\Delta t_{i,j}), \ 0 \le i \le N - 1, \ 0 \le j \le M - 1. \qquad (30)$$

$\Delta t_{i,j}$ represents the timing advance of the moment at which the transmit signal of the uplink user j arrives at the downlink user i relative to the moment at which the expected signal sent by the network device to the downlink user i arrives at the downlink user i, namely, the timing advance of the cross-link interference signal of the user j to the user i relative to the expected signal. N represents a quantity of terminals (users) in an uplink service in the network, and M represents a quantity of terminals (users) in a downlink service in the network.

It should be noted that, in possible implementations of this embodiment, for a manner of obtaining $\Delta t_{i,j}$ and/or $2t_i$ by the network device, refer to the content described in S801 and S802 above. Details are not described herein again.

After the cyclic suffix is added to an OFDM symbol, transmittable resources in the network are reduced, that is, there are given cyclic suffix overheads. For example, after the cyclic suffix is added, an OFDM symbol period becomes longer, or OFDM symbol duration or cyclic prefix duration within an OFDM symbol period becomes shorter.

In an embodiment provided in this application, cyclic suffix overheads are considered when a network device determines a cyclic suffix length. Specifically, when determining the cyclic suffix length, the network device strikes a balance between a self-interference power, a cross-link interference power, and the cyclic suffix overheads that need to be suppressed.

In a possible implementation, when determining a cyclic suffix, the network device reduces a proportion of the OFDM cyclic suffix length in an entire OFDM symbol period as much as possible while meeting an interference suppression requirement, that is, increases a proportion of OFDM symbol duration in the OFDM symbol period.

For example, the cyclic suffix length $t_{cs}$ may be determined according to the following formula:

$$t_{cs} = \mathrm{argmax}\left[\frac{t_{sym} - t_{cs}}{t_{sym}} \log_2\left(\prod_{i=0}^{M-1}\left(1 + P_i^{rx}\Big/\left(\sum_{j=0,\Delta t_{i,j}>t_{cs}}^{N-1} P_{i,j}^{CLI} + u(2t_i - t_{cs})P_i^{SI} + n_i\right)\right)\right)\right].$$

For example, $t_{cs}$ may be alternatively determined according to the following formula:

$$t_{cs} = \mathrm{argmax}\left[\frac{t_{sym}}{t_{cs}} \log_2\left(\prod_{i=0}^{M-1}\left(1 + P_i^{rx}\Big/\left(\sum_{j=0,\Delta t_{i,j}>t_{cs}}^{N-1} P_{i,j}^{CLI} + u(2t_i - t_{cs})P_i^{SI} + n_i\right)\right)\right)\right].$$

In the foregoing two formulas, $t_{sym}$ represents an OFDM symbol length, M represents a quantity of terminals that are in a downlink service and that are in a full-duplex network, N represents a quantity of terminals that are in an uplink service and that are in the full-duplex network, $$P_i^{rx}$$

represents an expected signal power received by a downlink terminal i, $$P_{i,j}^{CLI}$$

represents an interference power of an uplink terminal j to the downlink terminal i, $$P_i^{SI}$$

represents a self-interference power of the downlink terminal i, $\Delta t_{i,j}$ represents timing advance of a cross-link interference signal relative to an expected signal, $2t_i$ represents timing advance of a self-interference signal of the terminal i relative to the expected signal, $$u(t) = \begin{cases} 0, t < 0 \\ 1, t \ge 0 \end{cases},$$

and $n_i$ represents a white noise power of the terminal i.

In a possible implementation, when a user in a network is mainly interfered with by the self-interference signal, the network device determines the OFDM cyclic suffix length based on a user self-interference power in the network and timing advance of a user self-interference signal relative to the expected signal. For example, the OFDM cyclic suffix length $t_{cs}$ may be calculated according to the following formula:

$$t_{cs} = \mathrm{argmax}\left[\frac{t_{sym} - t_{cs}}{t_{sym}} \log_2\left(\prod_{i=0}^{M-1}\left(1 + P_i^{rx}\Big/\left(u(2t_i - t_{cs})P_i^{SI} + n_i\right)\right)\right)\right].$$

For example, $t_{cs}$ may be alternatively determined according to the following formula:

$$t_{cs} = \arg\max\left[\frac{t_{sym}}{t_{cs}}\log_2\left(\prod_{i=0}^{M-1}\left(1 + P_i^{rx}\middle/\left(u(2t_i - t_{cs})P_i^{SI} + n_i\right)\right)\right)\right].$$

In the foregoing two formulas, $t_{sym}$ represents an OFDM symbol length, M represents a quantity of terminals that are in a downlink service and that are in a full-duplex network, $$P_i^{rx}$$

represents an expected signal power received by a downlink terminal i, $$P_i^{SI}$$

represents a self-interference power of the downlink terminal i, $2t_i$ represents timing advance of a self-interference signal of the terminal i relative to the expected signal, $$u(t) = \begin{cases} 0, & t < 0 \\ 1, & t \ge 0 \end{cases},$$

and $n_i$ represents a white noise power of the terminal i.

In a possible implementation, when a user in a network is mainly interfered with by a cross-link interference signal, for example, when most terminals in the network are in a half-duplex mode, the network device determines the OFDM cyclic suffix length based on an inter-user cross-link interference power in the network and the timing advance of the inter-user cross-link interference signal relative to the expected signal. For example, the OFDM cyclic suffix length $t_{cs}$ may be calculated according to the following formula:

$$t_{cs} = \arg\max\left[\frac{t_{sym} - t_{cs}}{t_{sym}}\right.$$
$$\left.\log_2\left(\prod_{i=0}^{M-1}\left(1 + P_i^{rx}\middle/\left(\sum_{j=0,\Delta t_{i,j} > t_{cs}}^{N-1} P_{i,j}^{CLI} + n_i\right)\right)\right)\right].$$

For example, $t_{cs}$ may be alternatively determined according to the following formula:

$$t_{cs} = \arg\max\left[\frac{t_{sym}}{t_{cs}}\log_2\left(\prod_{i=0}^{M-1}\left(1 + P_i^{rx}\middle/\left(\sum_{j=0,\Delta t_{i,j} > t_{cs}}^{N-1} P_{i,j}^{CLI} + n_i\right)\right)\right)\right].$$

In the foregoing two formulas, $t_{sym}$ represents an OFDM symbol length, M represents a quantity of terminals that are in a downlink service and that are in a full-duplex network, N represents a quantity of terminals that are in an uplink service and that are in the full-duplex network, $$P_i^{rx}$$

represents an expected signal power received by a downlink terminal i, $$P_{i,j}^{CLI}$$

represents an interference power of an uplink terminal j to the downlink terminal i, $\Delta t_{i,j}$ represents timing advance of a cross-link interference signal relative to the expected signal, and $n_i$ represents a white noise power of the terminal i.

It should be noted that, for a parameter used when the network device obtains and determines the OFDM cyclic suffix length in the possible implementations of this embodiment, refer to the content described in S801 and S802. Details are not described herein again.

In the foregoing embodiment, when determining the cyclic suffix length, in addition to the user self-interference power, the inter-user cross-link interference power, and the timing advance of the interference signal relative to the expected signal, the network device further considers overheads caused by the cyclic suffix length. This improves a total network throughput while implementing interference suppression.

A multipath latency spread, timing advance of inter-user cross-link interference, and timing advance of self-interference that are in the full-duplex network are related to coverage of the network. When the coverage is small, the multipath latency spread, the timing advance of the inter-user cross-link interference, and the timing advance of the self-interference that are in the full-duplex network are also small. Therefore, in a scenario in which the coverage of the full-duplex network is small, inter-symbol interference ISI can be canceled without increasing additional overheads, and the network device does not need to dynamically adjust the OFDM cyclic suffix length.

In an embodiment provided in this application, a network device statically configures an OFDM cyclic suffix length. This embodiment is applicable to a scenario in which coverage of a full-duplex network is small, for example, indoors or a factory.

In a possible implementation, the network device uses a maximum value of timing advance of an interference signal relative to an expected signal within coverage of the network device as a statically configured value of the OFDM cyclic suffix length. In this way, there is no inter-symbol interference ISI within the coverage. A scenario in which a subcarrier spacing is 15 kHz is used as an example. The OFDM cyclic suffix length may be statically configured by using the following Table 2.

TABLE 2

| Static configuration table of an OFDM cyclic suffix with the subcarrier spacing of 15 kHz | | | | | |
|---|---|---|---|---|---|
| Configuration index | 0 | 1 | 2 | 3 | 4 |
| Quantity of symbols | 14 | 14 | 14 | 14 | 14 |
| OFDM symbol duration (μs) | 66.667 | 66.667 | 66.667 | 66.667 | 66.667 |
| CP duration (μs) | 4.355 | 4.021 | 3.688 | 2.688 | 1.355 |
| CS duration (μs) | 0.333 | 0.667 | 1.000 | 2.000 | 3.333 |
| Coverage (m) | 50 | 100 | 150 | 300 | 500 |

The cyclic suffix length (CS duration) configured in Table 2 may meet that there is no inter-symbol interference ISI in uplink and downlink communication within corresponding coverage at the subcarrier spacing of 15 kHz. For example, when a coverage radius is 100 m, the maximum value of the timing advance of the interference signal relative to the expected signal is $$2 \cdot \frac{100}{3 \cdot 10^8} = 0.667$$

microseconds, and the cyclic suffix CS length is greater than or equal to 0.667 μs, it can be ensured that there is no inter-symbol interference ISI in the network within the coverage. Herein, the OFDM symbol duration is 66.667 μs, a cyclic prefix CP length is 4.021 μs, the cyclic suffix CS length is 0.667 μs, and an OFDM period is 71.355 μs. When the coverage radius is 150 m and the cyclic suffix CS length is 1 μs, it can be ensured that there is no ISI in the network within the coverage. Herein, the OFDM symbol duration is 66.667 μs, the cyclic prefix CP length is 3.688 μs, the cyclic suffix CS length is 1 μs, and the OFDM period is 71.355 μs.

In the foregoing possible implementation, because the coverage is small, and a multipath latency spread is also small, the network device may use a part of the cyclic prefix In an embodiment provided in this application, when dynamically configuring a cyclic suffix length based on different interference levels, a network device sets the cyclic suffix length as a configuration item in advance. This configuration item corresponds to a range of cyclic suffix duration. The network device dynamically determines the cyclic suffix length by using the method described in the foregoing embodiments, and determines the configuration item to which the determined cyclic suffix length belongs. When delivering configuration information to a terminal device, the network device sends a configuration index corresponding to the configuration item to which the determined cyclic suffix length belongs. After receiving the configuration information, the terminal device obtains a corresponding OFDM cyclic suffix length based on the configuration index, where the OFDM cyclic suffix length is a maximum value of cyclic suffix duration corresponding to the configuration index.

A scenario in which a subcarrier spacing is 15 kHz is used as an example. The OFDM cyclic suffix length may be dynamically configured by using the following Table 3.

TABLE 3

| | Dynamic configuration table of an OFDM cyclic suffix with the subcarrier spacing of 15 kHz | | | |
|---|---|---|---|---|
| Configuration index | 0 | 1 | 2 | 3 |
| Quantity of symbols | 14 | 12 | 10 | 8 |
| OFDM symbol duration (μs) | 66.667 | 66.667 | 66.667 | 66.667 |
| CP duration (μs) | 1.355 | 4.688 | 4.688 | 4.688 |
| CS duration (μs) | 3.407 | 11.979 | 28.646 | 53.646 |
| Range of the CS duration (μs) | 0 to 3.407 | 3.407 to 11.979 | 11.979 to 28.646 | 11.979 to 53.646 |
| Coverage (m) | 0 to 511 | 511 to 1796.85 | 1796.85 to 4296.9 | 1796.85 to 8046.9 |

CP length for the cyclic suffix CS length without changing the OFDM symbol duration and the OFDM period, to ensure that there is no inter-symbol interference within the coverage of the network device.

In a possible implementation, the configuration may be used as a static configuration and is notified to a user by using a master information block (MIB) during user access.

In a possible implementation, the configuration may alternatively be implicitly notified to a user by using a cell identity (ID). For example, after obtaining the cell ID in an initial access process, the user uses, as an index of a static configuration, the cell ID or a remainder obtained by performing a modulo operation on the cell ID by using a value. This is not limited in this application.

It should be noted that the static configuration information delivered by the network device to a terminal device may be index information, and the index information indicates a configuration value of the OFDM cyclic suffix length. After receiving the static configuration information, the terminal device obtains a corresponding OFDM cyclic suffix length based on the index information. The static configuration information delivered by the network device to the terminal may be a specific configuration value, and the terminal device determines the OFDM cyclic suffix length based on the configuration value delivered by the network device.

In the foregoing embodiment, in a scenario in which the network coverage is small, the network device delivers the statically configured cyclic suffix length to the terminal device, to ensure that there is no inter-symbol interference ISI in the network without increasing additional overheads.

For example, when the configuration index is 1, the terminal device adds a cyclic suffix length whose length is 11.979 μs after an OFDM symbol. The cyclic suffix length corresponds to a cyclic suffix length that is in a range of 3.407 μs to 11.979 μs and that is determined by the network device.

In a possible implementation, the configuration information may be notified to a user by using an RRC message, or may be notified to the user by using other information. This is not limited in this application.

In the foregoing embodiment, the cyclic suffix length dynamically determined by the network device is used as the configuration item. When delivering the configuration information of the cyclic suffix to the terminal device, the network device sends the configuration index corresponding to the configuration item, and the terminal device obtains the cyclic suffix length based on the configuration index. Bit overheads for configuring the cyclic suffix are reduced by using the foregoing method while it is ensured that there is no inter-symbol interference in a network.

Figures 12B, 13:
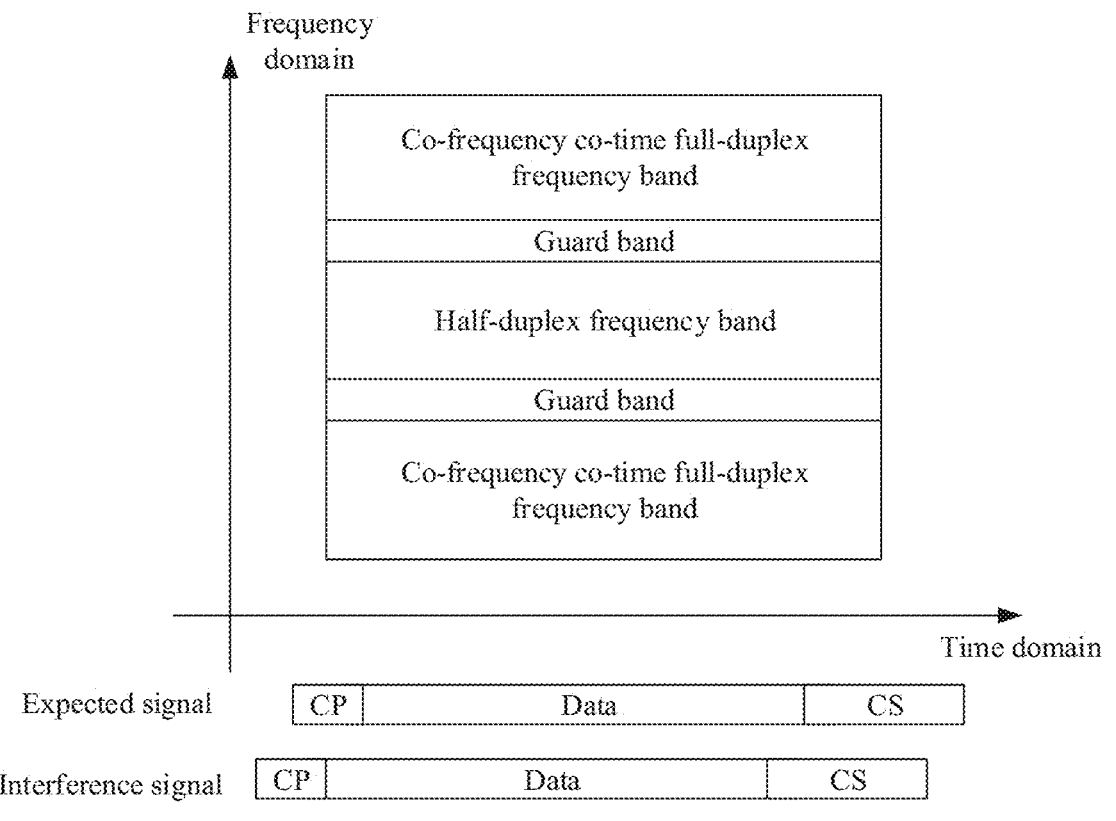
FIG. 12*b* is a schematic diagram of structures of a frequency domain signal and a time domain signal according to an embodiment of this application.
FIG. 13 is a schematic diagram of a communications apparatus according to an embodiment of this application.

The method for configuring the cyclic suffix for the OFDM symbol provided in this embodiment of this application is further applicable to a scenario in which a full-duplex frequency band is adjacent to a half-duplex frequency band. As shown in FIG. 12a and FIG. 12b, an expected downlink signal received by a user may be divided into a half-duplex frequency band and a full-duplex frequency band in frequency domain. The half-duplex frequency band is used to transmit a control message, for example, a synchronization signal and PBCH block (SSB), a physical downlink control channel (PDCCH), and the like. In addition, the user further receives an uplink interference signal from another user. Because the interference signal and the expected signal are asynchronous, the interference signal generates inter-carrier interference ICI in a receive window of the expected signal due to inter-symbol interference ISI. This affects reliability of control message transmission.

In a possible implementation, as shown in FIG. 12a, when there is no OFDM cyclic suffix proposed in this embodiment of this application in an OFDM period, a guard band needs to be added between the half-duplex frequency band and the full-duplex frequency band, to protect a control signal from being affected by the ICI. Bandwidth of the guard band is related to an interference power.

In a possible implementation, as shown in FIG. 12b, based on current interference, the cyclic suffix is added after an OFDM symbol, so that for the interference signal, there is no ICI caused by the ISI in the receive window of the expected signal, and subcarrier orthogonality of the interference signal is not damaged. When this possible implementation is used, there is no need to add the additional guard band between the half-duplex transmission frequency band and the full-duplex transmission frequency band. This improves a network throughput.

In the foregoing embodiments provided in this application, the method provided in embodiments of this application is described from a perspective of interaction between the network device and the terminal. To implement functions in the foregoing methods provided in embodiments of this application, the terminal and/or the network device may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

For example, FIG. 13 is a schematic diagram of a structure of a communications apparatus 1300. The communications apparatus 1300 includes a processing unit 1302 and a transceiver unit 1301.

In a possible implementation, the apparatus 1300 may be the terminal device in the foregoing method embodiments, an apparatus (for example, a chip, a chip system, or a circuit) in the terminal device, or an apparatus that can match the terminal device for use.

When the communications apparatus 1300 is the terminal device, the processing unit 1302 is configured to obtain configuration information, where the configuration information includes information about an OFDM cyclic suffix length; and is further configured to determine the OFDM cyclic suffix length based on the obtained configuration information. The transceiver unit 1301 is configured to communicate with a network device by using the OFDM cyclic suffix length.

For specific implementations of the operations performed by the foregoing units, refer to the specific implementations of the operations performed by the terminal device in the foregoing method embodiments. Details are not described herein again.

In a possible implementation, the apparatus 1300 may be the network device in the foregoing method embodiments, an apparatus (for example, a chip, a chip system, or a circuit) in the network device, or an apparatus that can match the network device for use.

When the communications apparatus 1300 is the network device, the processing unit 1302 is configured to determine an OFDM cyclic suffix length. The transceiver unit 1301 is configured to deliver first configuration information to a terminal, where the configuration information includes information about the OFDM cyclic suffix length, and is further configured to communicate with the terminal by using the OFDM cyclic suffix length.

For specific implementations of the operations performed by the foregoing units, refer to the specific implementations of the operations performed by the network device in the foregoing method embodiments. Details are not described herein again.

Figure 14:
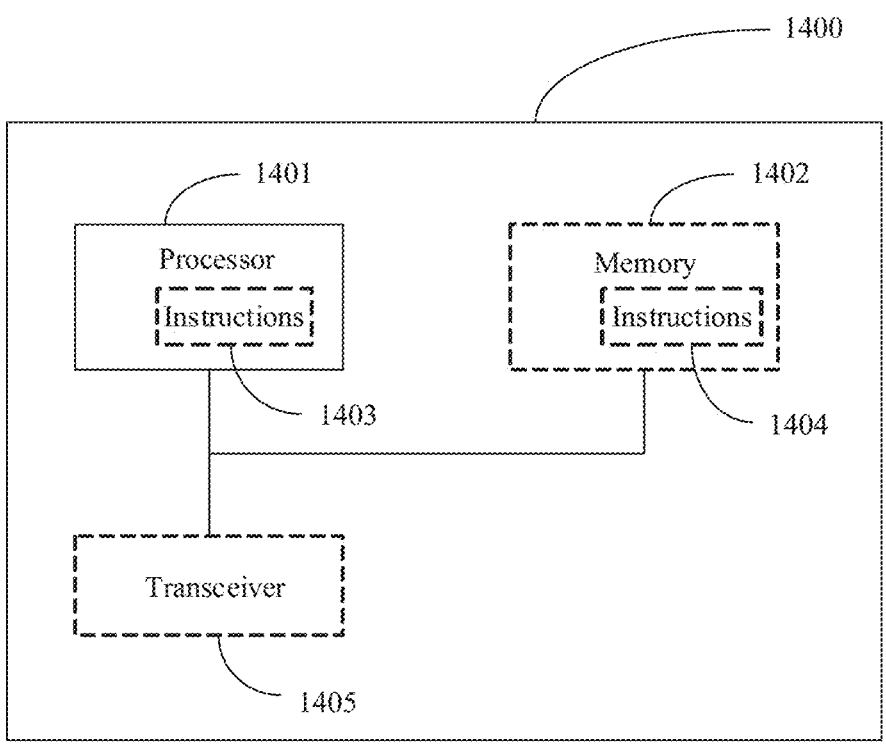
FIG. 14 is a schematic diagram of a communications apparatus according to an embodiment of this application.

FIG. 14 is a schematic diagram of a structure of a communications apparatus 1400. The communications apparatus 1400 may be configured to implement a method corresponding to the network device, or a method corresponding to the terminal in the foregoing method embodiments. For details, refer to the description in the foregoing method embodiments.

The communications apparatus 1400 may include one or more processors 1401. The processor 1401 may also be referred to as a processing unit, and may implement a control function. The processor 1401 may be a general-purpose processor, a dedicated processor, or the like.

In an optional implementation, the processor 1401 may also store instructions 1403, and the instructions may be run by the processor, so that the communications apparatus 1400 performs the method, described in the foregoing method embodiments, corresponding to the terminal or the network device.

In another possible implementation, the communications apparatus 1400 may include a circuit. The circuit may implement the transmission, reception, or communications function in the foregoing method embodiments.

Optionally, the communications apparatus 1400 may include one or more memories 1402 coupled to the processor 1401. The memory stores instructions 1404 or intermediate data. The instructions 1404 may be run on the processor, so that the communications apparatus 1400 performs the method in the foregoing method embodiments. Optionally, the memory may further store other related data. Optionally, the processor may also store instructions and/or data. The processor and the memory may be separately disposed, or may be integrated together.

Optionally, the communications apparatus 1400 may further include a transceiver 1405.

The processor 1401 may be referred to as a processing unit. The transceiver 1405 may be referred to as a transceiver unit, a transceiver machine, a transceiver circuit, a transceiver, or the like, and is configured to implement transmission and reception functions of the communications apparatus.

If the communications apparatus is configured to implement an operation corresponding to the terminal device, for example, the transceiver 1405 may receive configuration information sent by the network device, and the transceiver 1405 may further complete another corresponding communications function. The processor 1401 may obtain the configuration information, and determine an OFDM cyclic suffix length based on the obtained configuration information. For a specific processing manner of each component, refer to related description in the foregoing embodiments.

If the communications apparatus is configured to implement an operation corresponding to the network device, for example, the transceiver 1405 may deliver configuration information including information about an OFDM cyclic suffix length to the terminal device, the transceiver 1405 may further complete another corresponding communications function, and the processor 1401 may determine the OFDM cyclic suffix length. For a specific processing manner of each component, refer to related description in the foregoing embodiments.

A function implemented by the processing unit 1302 in FIG. 13 may be implemented by the processor 1401, and a function implemented by the transceiver unit 1301 may be implemented by the transceiver 1405.

The processor 1401 may be a central processing unit (central processing unit, CPU), an application-specific integrated circuit (application specific integrated circuit, ASIC), or one or more integrated circuits configured to implement embodiments of this application, for example, one or more digital signal processors (digital signal processor, DSP) or one or more field programmable gate arrays (field programmable gate array, FPGA).

The memory 1402 described in this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. By way of example but not limitation, the RAM may include a plurality of forms in the following: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). Optionally, the memory may be integrated into the terminal device or the network device, or the memory may not be integrated into the terminal device or the network device. The memory may be provided externally. This is not specifically limited herein.

Optionally, the communications apparatus may be an independent device or may be a part of a large device. For example, the device may be an independent integrated circuit IC, a chip, or a chip system or subsystem; or a set having one or more ICs. Optionally, the IC set may also include a storage component configured to store data and/or instructions; an ASIC, for example, a modem (MSM); a module that can be embedded in another device; and a receiver, a terminal, a cellular phone, a wireless device, a handset, a mobile unit, a network device, or the like.

Figure 15:
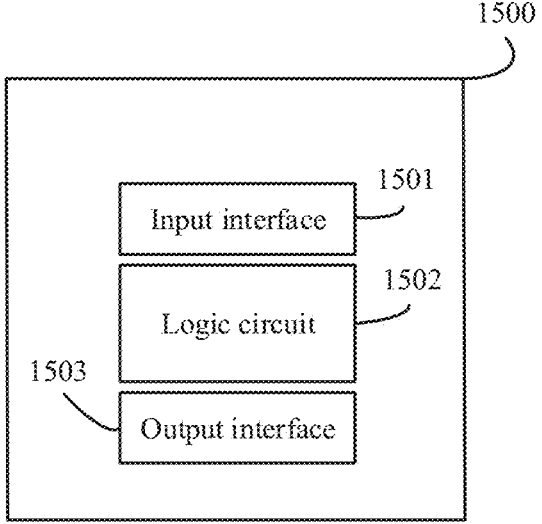
FIG. 15 is a schematic diagram of a communications apparatus according to an embodiment of this application.

FIG. 15 shows an apparatus 1500 according to an embodiment of this application. The apparatus 1500 may be configured to perform the method performed by the foregoing terminal or network device. The apparatus 1500 may be a communications device or a chip in the communications device. As shown in FIG. 15, the apparatus 1500 includes at least one input interface (Input(s)) 1501, a logic circuit 1502, and at least one output interface (Output(s)) 1503. Optionally, the logic circuit 1502 may be a chip or another integrated circuit that can implement the method in this application.

The logic circuit 1502 can implement the method performed by the terminal or the network device in the foregoing embodiments.

The input interface 1501 is configured to receive data, and the output interface 1503 is configured to send data. For example, when the apparatus 1500 is the terminal, the input interface 1501 may be configured to receive configuration information sent by the network device. The input interface 1501 and the output interface 1503 may be further configured to communicate with the network device by using an OFDM cyclic suffix length. When the apparatus 1500 is the network device, the output interface 1503 is configured to deliver configuration information to the terminal device. The input interface and the output interface may be further configured to communicate with the terminal by using an OFDM cyclic suffix length.

For functions of the input interface 1501, the logic circuit 1502, or the output interface 1503, refer to the method performed by the terminal or the network device in the foregoing embodiments. Details are not described herein again.

When the communications apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communications apparatus is a chip used in a network device, the chip in the network device implements the functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

Based on a same concept as that of the foregoing method embodiments, an embodiment of this application further provides a computer-readable storage medium. The computer-readable storage medium stores a computer program. When the program is executed by a processor, the computer is enabled to perform an operation performed by the terminal or the network device in any one of the foregoing method embodiments and the possible implementations of the method embodiments.

Based on a same concept as the foregoing method embodiments, this application further provides a computer program product. The computer program product may include instructions. When the computer program product is invoked and executed by a computer, the computer may be enabled to implement an operation performed by the terminal or the network device in any one of the foregoing method embodiments and the possible implementations of the method embodiments.

Based on a same concept as that of the foregoing method embodiments, this application further provides a chip or a chip system. The chip may include a processor. The chip may further include a memory (or a storage module) and/or a transceiver (or a communications module), or the chip is coupled to a memory (or a storage module) and/or a transceiver (or a communications module). The transceiver (or the communications module) may be configured to support the chip in wired and/or wireless communication, and the memory (or the storage module) may be configured to store a program. The processor invokes the program to implement an operation performed by the terminal or the network device in any one of the foregoing method embodiments and the possible implementations of the method embodiments. The chip system may include the chip, or may include the chip and another discrete component, for example, a memory (or a storage module) and/or a transceiver (or a communications module).

Based on a same concept as the foregoing method embodiments, this application further provides a communications system. The communications system may include the foregoing terminal and/or the foregoing network device. The communications system may be configured to implement an operation performed by the terminal or the network device in any one of the foregoing method embodiments and the possible implementations of the method embodiments. For example, the communications system may have a structure shown in FIG. 5.

Embodiments of this application are described with reference to the flowcharts and/or block diagrams of the method, the apparatus, and the computer program product according to embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

The foregoing description is merely some specific implementations of this application, but is not intended to limit the protection scope of this application. Any person skilled in the art may make changes and modifications to these embodiments within the technical scope disclosed in this application. Therefore, the following claims are intended to be construed as to cover the foregoing embodiments and to indicate changes and modifications falling within the scope of this application. Therefore, the protection scope of this application shall be subject to the protection scope of the claims.

What is claimed is:

1. A signal sending method, comprising:

obtaining, by a terminal in a co-frequency co-time full-duplex (CCFD) system, first configuration information at a first moment, wherein the first configuration information comprises information about a first orthogonal frequency division multiplexing (OFDM) cyclic suffix length;

determining, by the terminal, the first OFDM cyclic suffix length based on the first configuration information; and communicating, by the terminal in a full-duplex mode, with a network device at a second moment by using the first OFDM cyclic suffix length, wherein the second moment is a moment after the first moment.

2. The method according to claim 1, wherein the terminal communicates with the network device before the second moment by using a second OFDM cyclic suffix length.

3. The method according to claim 2, wherein the second OFDM cyclic suffix length is a default configured OFDM cyclic suffix length.

4. The method according to claim 1, wherein:

the first OFDM cyclic suffix length is determined based on one or more of an inter-user cross-link interference power, a user self-interference power, or timing advance within coverage of the network device; and the timing advance within coverage of the network device comprises at least one of timing advance of a cross-link interference signal relative to an expected signal or timing advance of a self-interference signal relative to an expected signal.

5. The method according to claim 4, wherein the method further comprises:

receiving, by the terminal, a cross-link interference measurement message delivered by the network device;

determining, by the terminal, at least one of an inter-user transmission latency or the inter-user cross-link interference power;

determining the timing advance within coverage of the network device based on the inter-user transmission latency, wherein the inter-user transmission latency is a transmission latency between the terminal and another terminal in a network, and the inter-user cross-link interference power is a power of interference caused by the another terminal in the network to the terminal; and feeding back, by the terminal, at least one of the inter-user cross-link interference power or the inter-user transmission latency to the network device.

6. The method according to claim 4, wherein the method further comprises:

determining, by the terminal, the user self-interference power, and feeding back the user self-interference power to the network device.

7. The method according to claim 1, wherein the communicating, by the terminal, with a network device at a second moment by using the first OFDM cyclic suffix length comprises:

when the terminal communicates with the network device, adding a cyclic suffix that meets the first OFDM cyclic suffix length to each OFDM symbol; or when the terminal communicates with the network device, adding cyclic suffixes that meet the first OFDM cyclic suffix length to some OFDM symbols.

8. A signal sending method, comprising:

determining, by a network device in a co-frequency co-time full-duplex (CCFD) system, a first orthogonal frequency division multiplexing (OFDM) cyclic suffix length;

delivering, by the network device, first configuration information at a first moment, wherein the first configuration information comprises information about the first OFDM cyclic suffix length; and communicating, by the network device in a full-duplex mode, with a terminal at a second moment by using the first OFDM cyclic suffix length.

9. The method according to claim 8, wherein the network device communicates with the terminal before the second moment by using a second OFDM cyclic suffix length.

10. The method according to claim 9, wherein the second OFDM cyclic suffix length is a default configured OFDM cyclic suffix length.

11. The method according to claim 8, wherein the determining, by a network device, a first OFDM cyclic suffix length comprises:

when the terminal accesses the network device for an initial time, determining, by the network device, the first OFDM cyclic suffix length; or determining, by the network device, the first OFDM cyclic suffix length when an update trigger condition is met.

12. The method according to claim 8, wherein the determining, by a network device, a first OFDM cyclic suffix length comprises:

determining, by the network device, the first OFDM cyclic suffix length based on one or more of an inter-user cross-link interference power, a user self-interference power, or timing advance within coverage, wherein the timing advance within coverage comprises at least one of timing advance of a cross-link interference signal relative to an expected signal or timing advance of a self-interference signal relative to an expected signal.

13. The method according to claim 12, wherein the method further comprises:

delivering, by the network device, a cross-link interference measurement message to the terminal, wherein the cross-link interference measurement message is used to obtain an inter-user transmission latency and the inter-user cross-link interference power, and the inter-user transmission latency is used to determine the timing advance within coverage.

14. The method according to claim 12, wherein the method further comprises:

determining, by the network device, an inter-user transmission latency based on location information of the terminal, wherein the inter-user transmission latency is used to determine the timing advance within coverage; and determining the inter-user cross-link interference power based on an uplink transmit power of the terminal.

15. The method according to claim 12, wherein the method further comprises:

obtaining, by the network device, the user self-interference power from the terminal, or determining the user self-interference power based on a self-interference cancellation capability of the terminal.

16. A communications apparatus in a co-frequency co-time full-duplex (CCFD) system, comprising:

at least one processor, wherein the at least one processor is coupled to a memory storing a computer program or instructions which, when executed by the at least one processor, cause the communication apparatus in the CCFD system to:

obtain first configuration information at a first moment, wherein the first configuration information comprises information about a first orthogonal frequency division multiplexing (OFDM) cyclic suffix length;

determine the first OFDM cyclic suffix length based on the first configuration information; and communicate with a network device in a full-duplex mode at a second moment by using the first OFDM cyclic suffix length, wherein the second moment is a moment after the first moment.

17. The communications apparatus according to claim 16, wherein the communications apparatus communicates with the network device before the second moment by using a second OFDM cyclic suffix length.

18. The communications apparatus according to claim 17, wherein the second OFDM cyclic suffix length is a default configured OFDM cyclic suffix length.

19. The communications apparatus according to claim 16, wherein:

the first OFDM cyclic suffix length is determined based on one or more of an inter-user cross-link interference power, a user self-interference power, or timing advance within coverage of the network device; and the timing advance within coverage of the network device comprises at least one of timing advance of a cross-link interference signal relative to an expected signal or timing advance of a self-interference signal relative to an expected signal.

20. The communications apparatus according to claim 19, wherein the computer program or the instructions, when executed by the at least one processor, further cause the communication apparatus to:

receive a cross-link interference measurement message delivered by the network device;

determine at least one of an inter-user transmission latency or the inter-user cross-link interference power;

determine the timing advance within coverage of the network device based on the inter-user transmission latency, wherein the inter-user transmission latency is a transmission latency between the communications apparatus and another communications apparatus in a network, and the inter-user cross-link interference power is a power of interference caused by the another communications apparatus in the network to the communications apparatus; and feedback at least one of the inter-user cross-link interference power or the inter-user transmission latency to the network device.

* * * * *